United States Patent
Amo et al.

(10) Patent No.: US 11,131,400 B2
(45) Date of Patent: Sep. 28, 2021

(54) HIGH-PRESSURE FUEL SUPPLY PUMP AND METHOD OF MANUFACTURING THE SAME

(71) Applicant: HITACHI AUTOMOTIVE SYSTEMS, LTD., Hitachinaka (JP)

(72) Inventors: Mina Amo, Tokyo (JP); Kenya Ohashi, Tokyo (JP); Arata Kagiyama, Hitachinaka (JP); Koichi Yamaka, Hitachinaka (JP); Noriyuki Maekawa, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 16/764,016

(22) PCT Filed: Dec. 7, 2018

(86) PCT No.: PCT/JP2018/045023
§ 371 (c)(1),
(2) Date: May 14, 2020

(87) PCT Pub. No.: WO2019/131051
PCT Pub. Date: Jul. 4, 2019

(65) Prior Publication Data
US 2020/0284368 A1    Sep. 10, 2020

(30) Foreign Application Priority Data
Dec. 26, 2017  (JP) .............................. JP2017-249220

(51) Int. Cl.
*F16K 27/02*    (2006.01)
*B23K 26/342*   (2014.01)

(52) U.S. Cl.
CPC .......... *F16K 27/029* (2013.01); *B23K 26/342* (2015.10)

(58) Field of Classification Search
CPC ........................... F16K 27/029; B23K 26/342
See application file for complete search history.

(56) References Cited

U.S. PATENT DOCUMENTS 6,886,809 B2 *   5/2005   Kiyotoki .................. G21D 1/02
                                                        251/368
2008/0193675 A1   8/2008   Wu et al.

FOREIGN PATENT DOCUMENTS

JP            2008-522039 A      6/2008

OTHER PUBLICATIONS

International Search Report and English Translation, PCT/JP2018/045023, dated Mar. 5, 2019, 4 pgs.

* cited by examiner

*Primary Examiner* — Eric Keasel
(74) *Attorney, Agent, or Firm* — Volpe Koenig

(57) ABSTRACT

Provided is a high-pressure fuel supply pump and a method of manufacturing thereof which can suppress the progress of corrosion and cavitation erosion even when the pressure becomes higher, or when biofuel or a fuel having a high oil content of biofuel is used. Therefore, the high-pressure fuel supply pump includes a discharge valve 51b that discharges fuel, and a discharge valve seat 51a on which the discharge valve 51b is seated. The base material of the discharge valve 51b and the discharge valve seat 51a is a steel material. On the surface of the discharge valve 51b, a Co-based alloy layer 70b and a Cr-enriched portion 70b1 having a higher Cr concentration than the surrounding Co-based alloy layer 70b are formed. The Co-based alloy layer 70a is formed on the surface of the discharge valve seat 51a.

13 Claims, 10 Drawing Sheets

FUEL FLOW WHEN VALVE IS OPENED

HIGH-PRESSURE FUEL SUPPLY PUMP AND METHOD OF MANUFACTURING THE SAME

TECHNICAL FIELD

The present invention relates to a high-pressure fuel supply pump for pumping fuel to a fuel injection valve of an internal combustion engine and a method of manufacturing the same.

BACKGROUND ART

PTL 1 discloses a ductile cobalt-based alloy which contains about 0.12% to about 0.7% by weight of carbon, about 20% to about 30% by weight of chromium, about 10% to about 15% by weight of molybdenum, about 1% to about 4% by weight of nickel, and cobalt of the remaining part. The alloy is applied as an overlay, so that wear resistance and corrosion resistance are imparted to the metal substrate without cracking during solidification of the alloy.

CITATION LIST

Patent Literature

PTL 1: JP 2008-522039 T

SUMMARY OF INVENTION

Technical Problem

As an internal combustion engine of a direct injection type in which the fuel is directly injected into a combustion chamber among internal combustion engines such as a vehicle, a high-pressure fuel supply pump is widely used which includes an electromagnetic suction valve which presses the fuel and discharges a desired amount of fuel.

As a material used for the high-pressure fuel supply pump, a high-strength, high-hardness material such as martensitic stainless steel has been used in a portion where wear resistance is required.

As a steel material that imparts wear resistance and corrosion resistance to a metal base material, a weldable cobalt-based alloy is known (see PTL 1).

A suction valve, a discharge valve, or a relief valve incorporated in the high-pressure fuel supply pump is constantly exposed to a strong flow of fuel while repeatedly opening and closing the valve. The violent flow causes cavities described by the cavitation phenomenon. As the cavity collapses at the valve surface, the valve surface experiences the collapse pressure of the cavity, and cavitation erosion develops over time. As cavitation erosion progresses and the valve surface is damaged, the valve cannot maintain oil tightness in the closed state.

In recent years, the environment surrounding automobiles and in-cylinder injection engine systems has been constantly changing. In particular, there will be increasing awareness of environmental conservation and regulations on soot and other emissions from automobiles.

In order to cope with these on the in-cylinder injection engine system side, it is necessary that the injector can inject leaner fuel into the cylinder of the engine. In this case, it is necessary to increase the pressure at which the high-pressure fuel supply pump can discharge. However, when the discharge pressure is increased, there is a concern that the probability of occurrence of cavitation erosion and the speed of progress will increase.

In recent years, fuel supplied to fuel pumps has been replaced by conventional mineral oil-derived fuel (gasoline) with the globalization of the market. A bio-derived biofuel (such as alcohol or methanol) or a fuel having a high oil content of biofuel is being produced and distributed. The use form of biofuel varies in each country and region, but there are many cases where it is mainly used as a blended fuel in which mineral oil and biofuel are mixed. Alcohol fuels derived from mineral oil or natural gas are often used alone or as mixed fuels mixed with conventional fuels derived from mineral oil.

Such a biofuel or a fuel having a high oil content of the biofuel is more likely to be corroded than a single gasoline system. Therefore, members used for a high-pressure fuel supply pump must also have corrosion resistance.

The tests by the present inventors have found that the time until cavitation erosion occurs differs between gasoline (E0) and ethanol fuel (E100). Using E100, cavitation erosion has been found to occur in at least half the time of gasoline.

When E10, E22, and E85 with different ethanol concentrations are used, cavitation erosion occurs in each time between E0 and E100. It has been also clarified that the length of time becomes shorter as the concentration of ethanol becomes higher.

It is expected that the mixing ratio of ethanol and the like to gasoline automobile fuel will increase in the future. Also, some countries and regions already use high-concentration ethanol fuel. Under such circumstances, the high-pressure fuel supply pump needs a countermeasure against cavitation erosion corresponding to a fuel containing a biofuel such as ethanol.

The material described in PTL 1 is an industrial part used in an environment where it is exposed to corrosive media such as acid and caustic alkali, for example, in seawater or brackish water, and has a certain degree of corrosion resistance in the above environment.

However, the test by the present inventors has revealed that the material described in PTL 1 cannot control the elution of a corrosive metal material in an alcohol fuel liquid.

For this reason, the material described in PTL 1 is excellent in abrasion resistance, but is liable to cause surface damage due to elution of the metal material. Therefore, even if the damage is very slight, the problem that cavitation erosion proceeds when the collapse pressure of the cavity is received has become apparent. That is, in the flow path where the high-pressure alcohol fuel collides, it is necessary that the material surface has both corrosion resistance and cavitation resistance.

The invention has been made in view of such circumstances, and an object thereof is to provide a high-pressure fuel supply pump and a method of manufacturing thereof which can suppress the progress of corrosion and cavitation erosion even when the pressure becomes higher, or when biofuel (such as alcohol or methanol) or a fuel having a high oil content of biofuel is used.

Solution to Problem

The invention includes a plurality of means for solving the above-mentioned problems, and is, for example, a high-pressure fuel supply pump which includes a valve that discharges fuel and a valve seat on which the valve sits. A base material of the valve and the valve seat is a steel material. On the surface of the valve, a Co-based alloy layer and a Cr-enriched portion where the Cr concentration is higher than a surrounding Co-based alloy layer are formed. A Co-based alloy layer is formed on a surface of the valve seat.

Advantageous Effects of Invention

According to the invention, it is possible to increase the fuel pressure of a high-pressure fuel supply pump, and to improve cavitation erosion resistance and corrosion resistance when using a biofuel (such as alcohol or methanol) or a fuel having a high oil content of the biofuel. Objects, configurations, and effects besides the above description will be apparent through the explanation on the following embodiments.

DESCRIPTION OF EMBODIMENTS

Hereinafter, embodiments of a high-pressure fuel supply pump and a method of manufacturing the high-pressure fuel supply pump according to the invention will be described with reference to the drawings.

First Embodiment

A high-pressure fuel supply pump and a method of manufacturing the high-pressure fuel supply pump according to a first embodiment of the invention will be described with reference to FIGS. 1 to 13.

Figure 1:
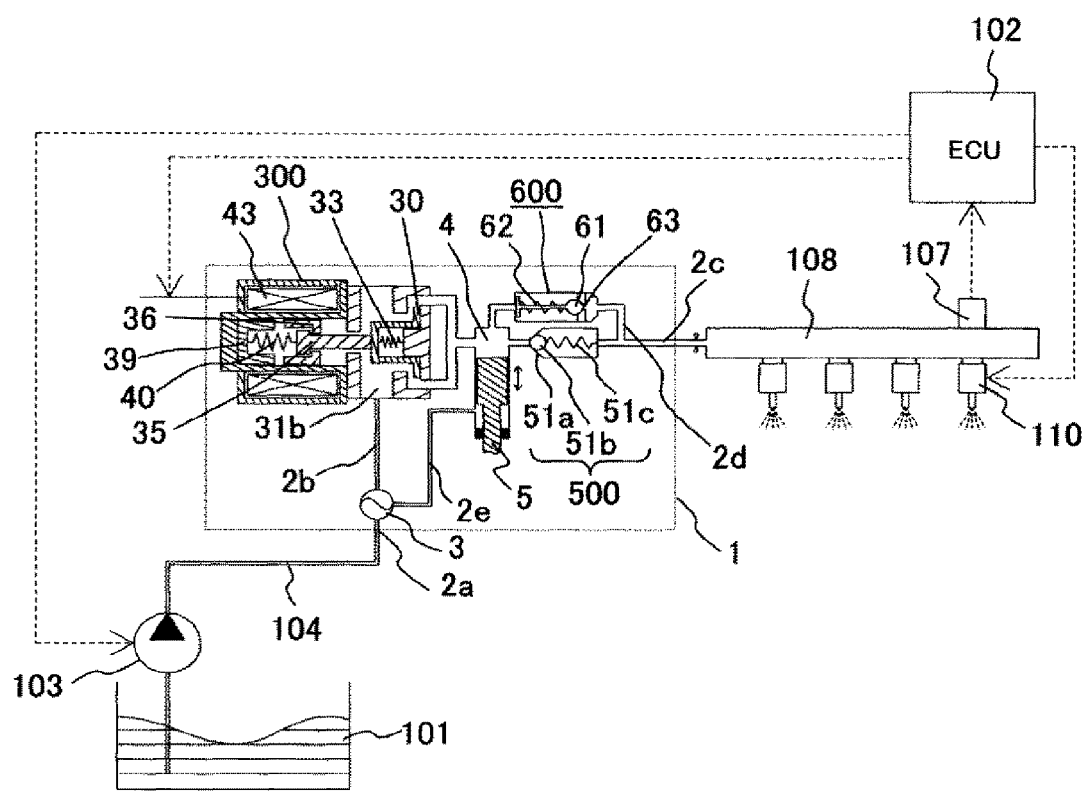
FIG. 1 is a diagram for describing a configuration of an engine system to which a high-pressure fuel supply pump is applied.
Figure 2:
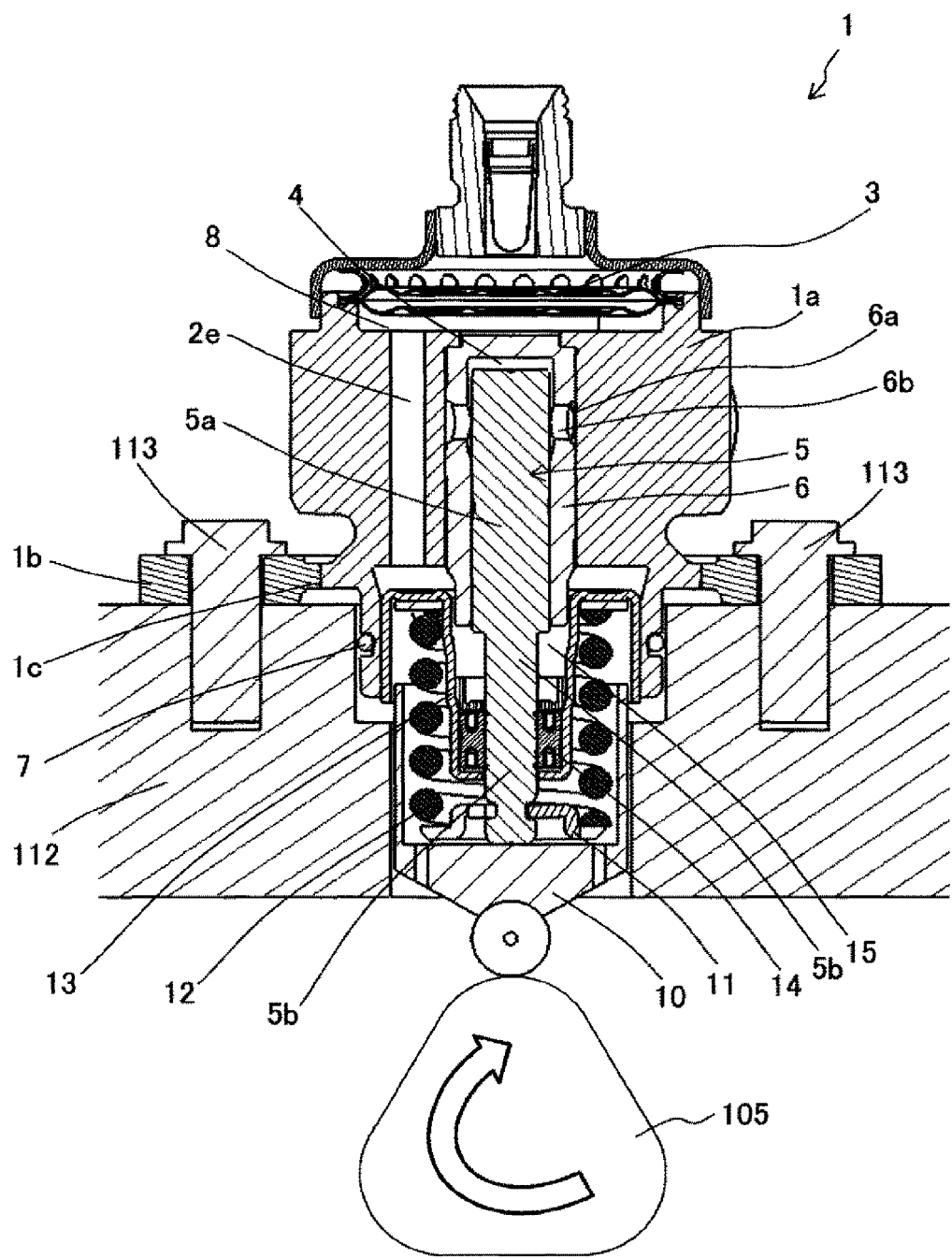
FIG. 2 is a longitudinal cross-sectional view of a high-pressure fuel supply pump according to a first embodiment of the invention.
Figure 3:
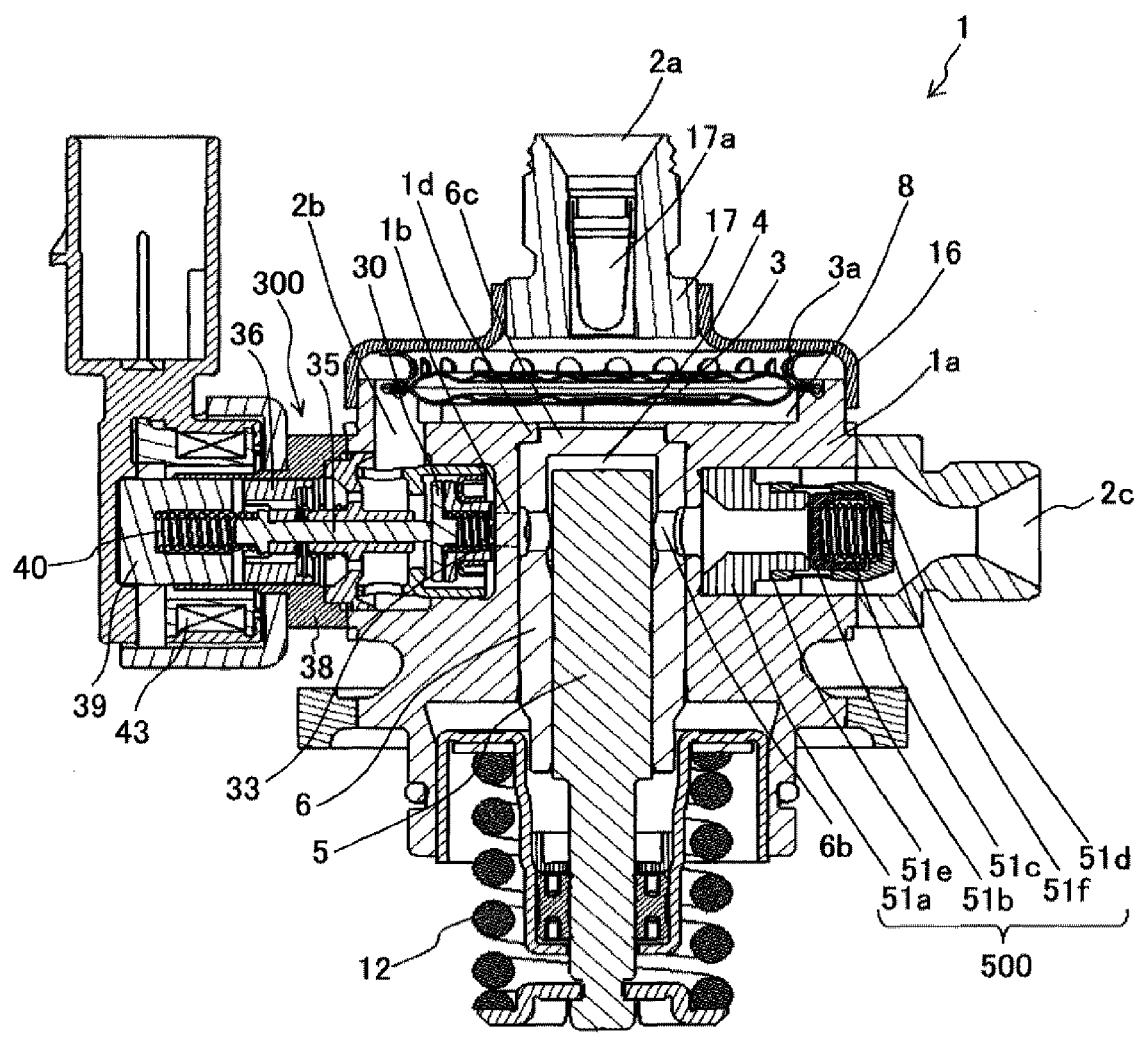
FIG. 3 is a longitudinal cross-sectional view of the high-pressure fuel supply pump according to the first embodiment of the invention, as viewed from a different direction from FIG. 2.
Figure 4:
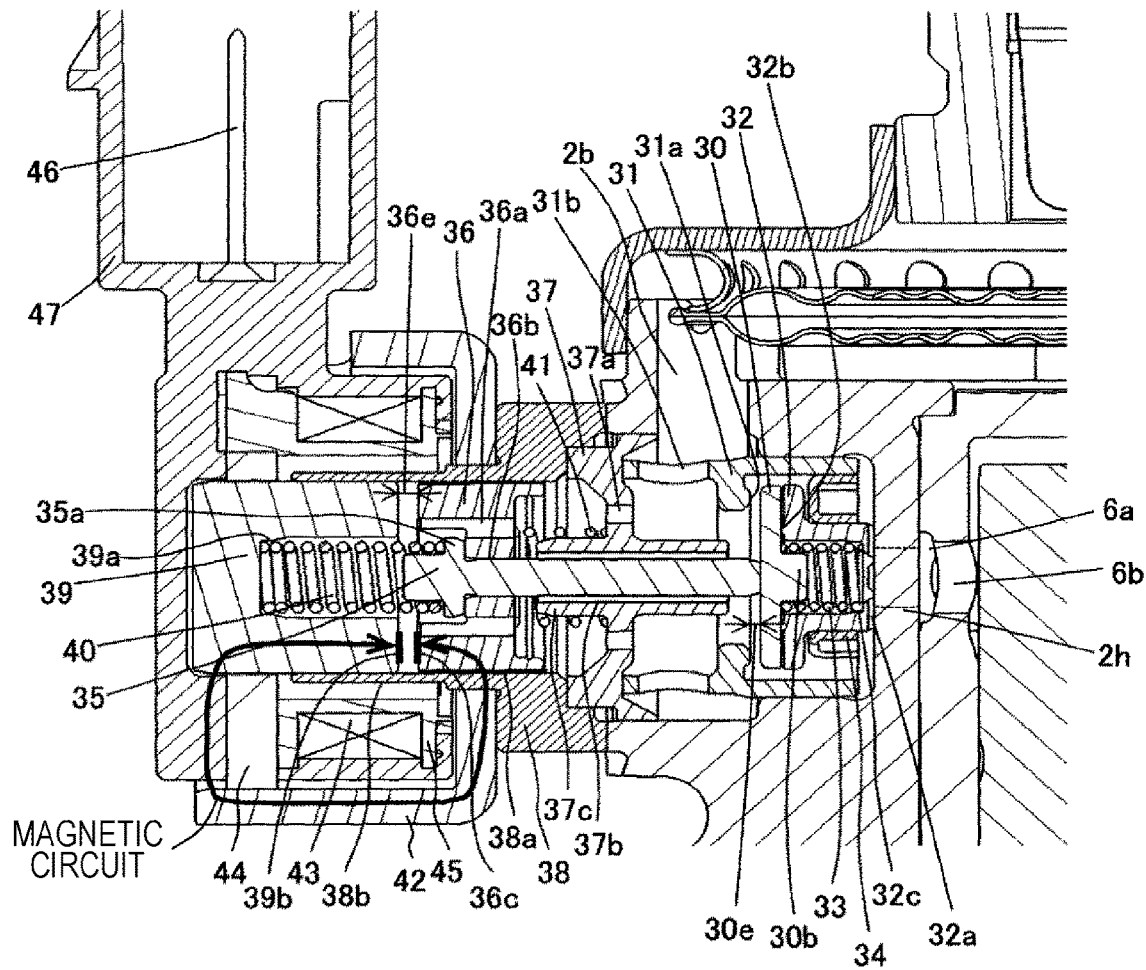
FIG. 4 is an enlarged longitudinal cross-sectional view of an electromagnetic valve mechanism of the high-pressure fuel supply pump according to the first embodiment of the invention, illustrating a state where the electromagnetic valve mechanism is in an open state.
Figure 5:
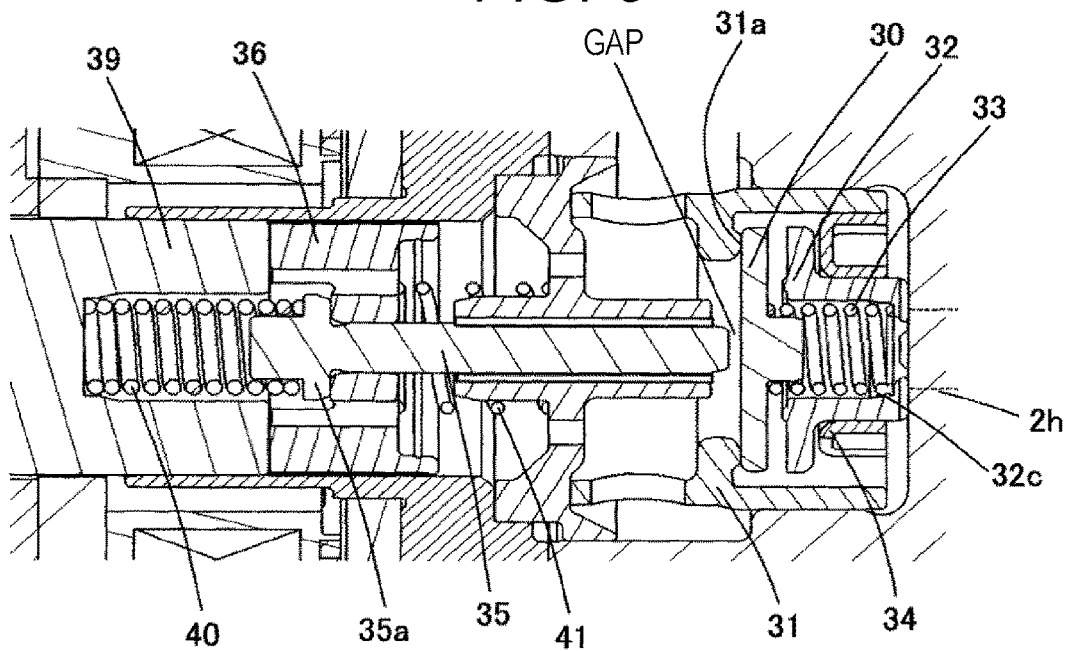
FIG. 5 is an enlarged longitudinal cross-sectional view of an electromagnetic suction valve of the high-pressure fuel supply pump according to the first embodiment of the invention, illustrating a state where the electromagnetic suction valve is a state in an initial closing stage and a state where power is supplied to the electromagnetic suction valve.
Figure 6:
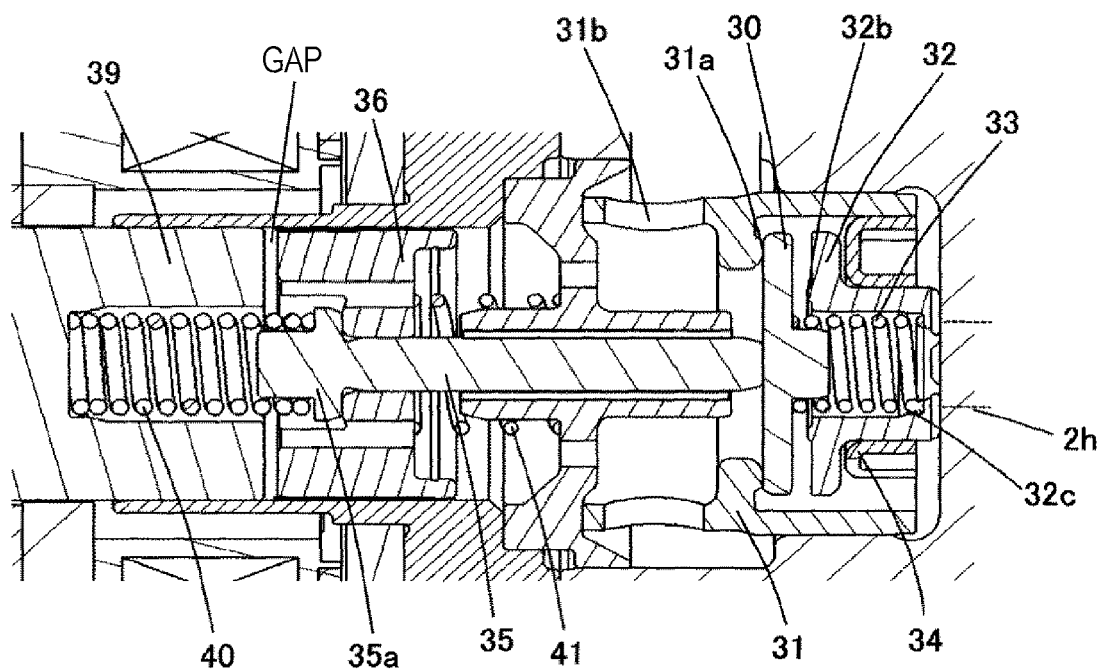
FIG. 6 is an enlarged longitudinal cross-sectional view of the electromagnetic suction valve of the high-pressure fuel supply pump according to the first embodiment of the invention, illustrating a state in which the electromagnetic suction valve is in a later closing stage and a state in which the power supply to the electromagnetic suction valve is released.
Figure 7:
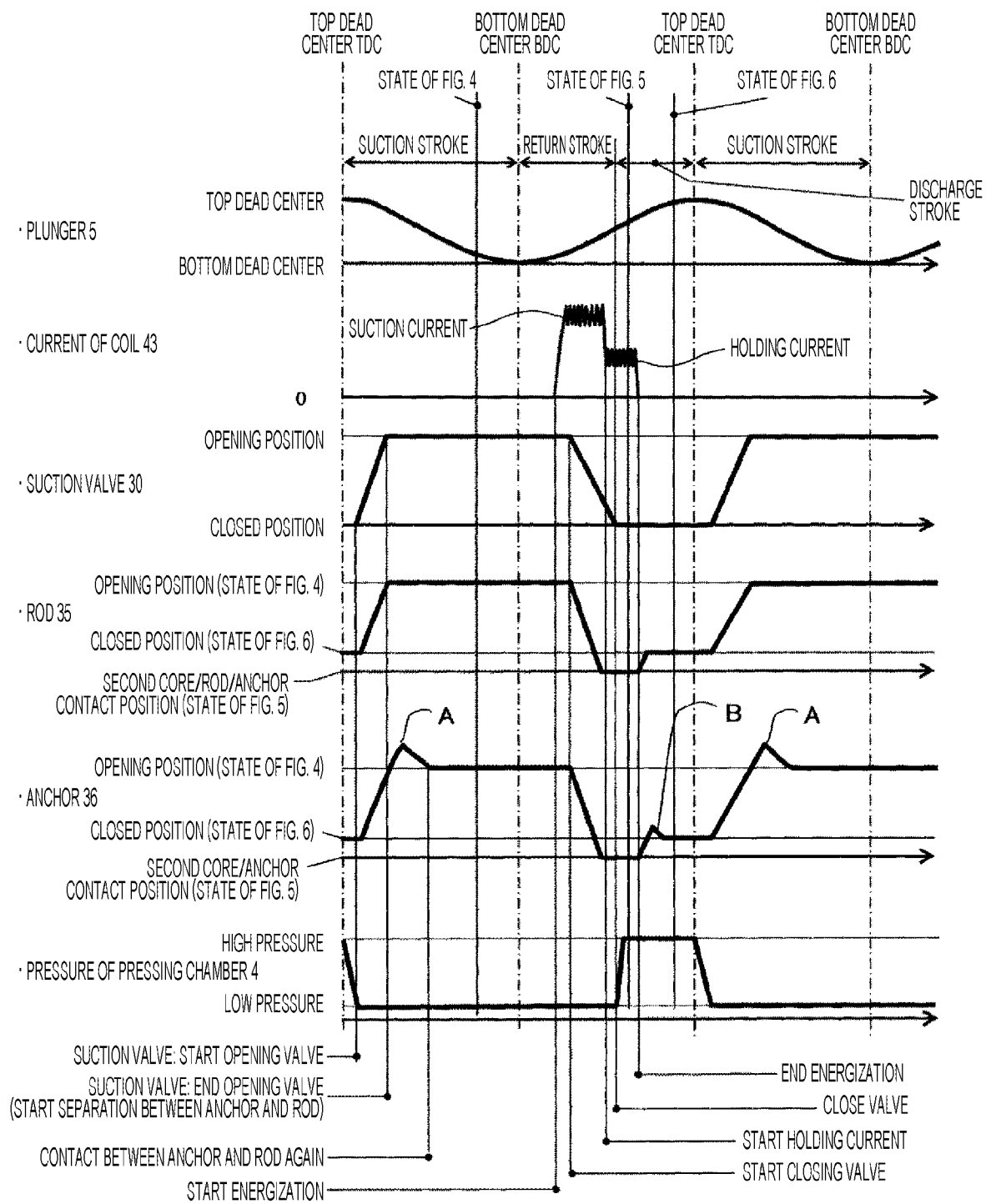
FIG. 7 is a timing chart illustrating an operation of a plunger and the electromagnetic suction valve of the high-pressure fuel supply pump according to the first embodiment of the invention.

First, the configuration and the operation of a system using the entire configuration of an engine system illustrated in FIG. 1 will be described using FIGS. 1 to 7. FIG. 1 is a drawing schematically illustrating the operation of the engine system. FIG. 2 is a longitudinal cross-sectional view of the high-pressure fuel supply pump of this embodiment, and FIG. 3 is a longitudinal cross-sectional view of the high-pressure fuel supply pump viewed from a different direction from FIG. 2. FIGS. 4 to 6 are enlarged views of an electromagnetic valve mechanism 300. FIG. 7 is a timing chart illustrating operations of a plunger and an electromagnetic suction valve of the high-pressure fuel supply pump.

In FIG. 1, a portion surrounded by a broken line illustrates a main body of a high-pressure fuel supply pump 1, and mechanisms and components illustrated in the broken line are integrally incorporated into a pump body 1a of the high-pressure fuel supply pump 1.

The fuel of a fuel tank 101 is pumped up by a feed pump 103 on the basis of a signal from an engine control unit 102 (hereinafter, referred to as ECU). The fuel is pressured to an appropriate feed pressure to pass through a suction pipe 104, and sent to a low-pressure fuel suction port 2a of the high-pressure fuel supply pump 1.

The fuel passed through the low-pressure fuel suction port 2a reaches a suction port 31b of the electromagnetic valve mechanism 300 of a capacity variance mechanism through a pressure pulsation damping mechanism 3 and a suction passage 2b. The electromagnetic valve mechanism 300 forms an electromagnetic suction valve mechanism.

The fuel that has flowed into the electromagnetic valve mechanism 300 flows into a pressing chamber 4 through a suction port that is opened and closed by a suction valve 30. A plunger 5 (see FIG. 2) is applied with power of a reciprocating motion by a cam 105 (see FIG. 2) of an engine. In a downward process of the plunger 5, the fuel is sucked from the suction valve 30 by the reciprocating motion of the plunger 5. The fuel is pressured in an upward process.

The pressurized fuel is pressure-fed to a common rail 108 on which a pressure sensor 107 is mounted via a discharge valve mechanism 500 having a discharge valve 51b. Then, an injector 110 injects the fuel to the engine on the basis of a signal from the ECU 102.

This embodiment relates to a pump which is applied to a system in which the injector 110 directly injects the fuel into the cylinder of the engine (so-called direct injection engine system). The high-pressure fuel supply pump 1 ejects a desired rate of supply fuel according to the signal from the ECU 102 to the electromagnetic valve mechanism 300.

The pump body 1*a* is further provided with a high-pressure flow path 2*d* that connects a fuel discharge port 2*c* on the downstream side of the discharge valve mechanism 500 and the pressing chamber 4, bypassing the discharge valve mechanism 500. The high-pressure flow path 2*d* is provided with a relief valve mechanism 600 having a relief valve 61 for restricting the flow of the fuel from the fuel discharge port 2*c* to the pressing chamber 4 in only one direction.

In the relief valve mechanism 600, the relief valve 61 is pressed against a relief valve seat 63 by a relief spring 62 that generates a pressing force. When the pressure difference between the inside of the pressing chamber 4 and the inside of the high-pressure flow path 2*d* is equal to or more than a predetermined pressure, an urging force of the relief spring 62 is set so that the relief valve 61 separates from the relief valve seat 63 and opens.

In the relief valve mechanism 600, at least the relief valve seat 63 and the relief valve 61 are made of a steel material. As the steel material, martensitic stainless steel having high strength, high hardness and excellent corrosion resistance, and a material obtained by subjecting such a martensitic stainless steel to a heat treatment are preferable.

When the common rail 108 has an abnormally high pressure due to a failure of the electromagnetic valve mechanism 300 of the high-pressure fuel supply pump 1, and the differential pressure between the fuel discharge port 2*c* and the pressing chamber 4 becomes equal to or more than the opening pressure of the relief valve 61, the relief valve 61 is opened, the fuel that has become abnormally high pressure is returned from the high-pressure flow path 2*d* to the pressing chamber 4, and the high-pressure piping such as the common rail 108 is protected.

Next, the configuration and operation of the high-pressure fuel supply pump 1 will be described with reference to FIGS. 2 to 4.

As illustrated in FIG. 2, generally, the high-pressure fuel supply pump 1 is in close contact with the plane of a cylinder head 112 of the internal combustion engine using a flange 1*b* provided on the pump body 1*a*, and is fixed with a plurality of bolts 113. The mounting flange 1*b* forms an annular fixed portion by being welded to the pump body 1*a* at the entire welded portion 1*c*. In this embodiment, laser welding is used, but the fixing method is not limited to laser welding.

As illustrated in FIG. 2, an O-ring 7 is fitted into the pump body 1*a* for sealing between the cylinder head 112 and the pump body 1*a*, thereby preventing the engine oil from leaking to the outside.

As illustrated in FIGS. 2 and 3, the pump body 1*a* is mounted with the cylinder 6 that guides the reciprocating motion of the plunger 5 and that has the end in a bottomed cylindrical shape so as to form a pressing chamber 4 inside. Further, the pressing chamber 4 is provided with the annular groove 6*a* on the outer peripheral side of the cylinder 6 which communicates to the discharge valve mechanism 500 for discharging fuel from the electromagnetic valve mechanism 300 for supplying fuel and the pressing chamber 4 to the fuel discharge port 2*c*, and a plurality of communication holes 6*b* which communicate with the annular groove 6*a* and the pressing chamber 4.

As illustrated in FIG. 3, the cylinder 6 is press-fitted and fixed to the pump body 1*a* in an outer diameter portion (outer peripheral portion) of the cylinder 6, and sealed with a pressured cylindrical surface so that the pressurized fuel does not leak to the low pressure side from a gap with the pump body 1*a*. A small diameter portion 6*c* fitted to a small diameter portion 1*d* provided in the pump body 1*a* is formed at an end of the cylinder 6 on the side of the pressing chamber 4. When the fuel in the pressing chamber 4 is pressurized, a force is applied to the cylinder 6 to press the cylinder 6 toward a low-pressure fuel chamber 8. The step of the small diameter portion 1*d* and the step of the small diameter portion 6*c* prevent the cylinder 6 from coming off toward the low-pressure fuel chamber 8 by receiving this force.

The upwardly-facing annular surface formed at the step of the small diameter portion 6*c* of the cylinder 6 and the downwardly-facing annular surface formed at the step of the small diameter portion 1*d* of the pump body 1*a* are formed as flat surfaces, and come into contact with each other in the axial direction. Therefore, a double sealing function is obtained in addition to the contact cylindrical surface between the pump body 1*a* and the cylinder 6.

As illustrated in FIG. 2. in the lower end of the plunger 5, there is provided a tappet 10 which converts a rotation motion of the cam 105 mounted in a cam shaft of the internal combustion engine into an up-down motion, and transmits the up-down motion to the plunger 5. The plunger 5 is tightly pressed to the tappet 10 by a spring 12 through a retainer 11. With this configuration, the plunger 5 can make a reciprocating motion in the vertical direction according to the rotation motion of the cam 105.

In addition, a plunger seal 14 held in the lower end of the inner periphery of a seal holder 13 is provided to slidably abut on the outer periphery of the plunger 5 in the lower portion in FIG. 2 of the cylinder 6. The fuel of the annular low-pressure fuel chamber 15 can be sealed even in a case where the plunger 5 slides, so that the fuel is prevented from leaking out. At the same time, lubricating oil (including also engine oil) smoothing a sliding portion in the internal combustion engine is prevented from flowing into the pump body 1*a*.

As illustrated in FIG. 3, a damper cover 16 is fixed to the head of the pump body 1*a*. A suction joint 17 is provided in the damper cover 16, and forms the low-pressure fuel suction port 2*a*. The fuel that has passed through the low-pressure fuel suction port 2*a* passes through a suction filter 17*a* fixed inside the suction joint 17, and passes through the pressure pulsation damping mechanism 3 and the suction passage 2*b* to the suction port 31*b* of the electromagnetic valve mechanism 300 (see FIGS. 1 and 4).

The suction filter 17*a* in the suction joint 17 plays a role of preventing that a foreign matter existing between the fuel tank 101 and the low-pressure fuel suction port 2*a* flows into the fuel so as to be sucked into the high-pressure fuel supply pump 1.

As illustrated in FIG. 2, the plunger 5 includes a large diameter portion 5*a* and a small diameter portion 5*b*. Therefore, the volume of the annular low-pressure fuel chamber 15 is increased or decreased according to the reciprocating motion of the plunger 5. Since a fuel passage 2*e* communicates with a low-pressure fuel chamber 8 (see FIG. 3), a changed volume of fuel flows from the annular low-pressure fuel chamber 15 to the low-pressure fuel chamber 8 when the plunger 5 descends, and flows from the low-pressure fuel chamber 8 to the annular low-pressure fuel chamber 15 when the plunger 5 ascends.

With this configuration, the fuel flow amount to the inside and outside of the pump in the suction process or the returning process of the pump can be reduced, and the pulsation is reduced.

As illustrated in FIG. 3, in the low-pressure fuel chamber 8, the pressure pulsation damping mechanism 3 is provided to reduce the propagation of the pressure pulsation generated in the high-pressure fuel supply pump 1 to the suction pipe 104. The pressure pulsation damping mechanism 3 is formed of a metal damper in which two corrugated disk-shaped metal plates are adhered to each other on the outer periphery thereof, and an inert gas such as argon is injected into the inside thereof.

In a case where the fuel flown into the pressing chamber 4 returns to the suction passage 2b (the suction port 31b) through the suction valve 30 which enters the open state again to control the volume, the pressure pulsation is generated in the low-pressure fuel chamber 8 by the fuel returned to the suction passage 2b (the suction port 31b). However, the pressure pulsation is absorbed and reduced as the metal damper of the pressure pulsation damping mechanism 3 expands and contracts.

The mounting bracket 3a is a member for fixing the metal damper to the inner peripheral portion of the pump body 1a, and is installed on the fuel passage. For this reason, a plurality of holes are provided so that fluid can freely flow between the front and back of the mounting bracket 3a.

As illustrated in FIG. 3, the discharge valve mechanism 500 is provided at the outlet of the pressing chamber 4. The discharge valve mechanism 500 is configured by a discharge valve seat 51a, the discharge valve 51b which abuts on and separates from the discharge valve seat 51a, the discharge valve spring 51c which urges the discharge valve 51b toward the discharge valve seat 51a, and a discharge valve holder 51d which stores the discharge valve 51b and the discharge valve seat 51a. The discharge valve seat 51a and the discharge valve holder 51d are bonded and integrated at an abutting portion 51e by welding to form the discharge valve mechanism 500.

In the discharge valve mechanism 500, at least the discharge valve seat 51a and the discharge valve 51b are made of a steel material. As the steel material, martensitic stainless steel such as SUS420J2 or SUS440C is suitable.

Further, in the discharge valve holder 51d, there is provided a stepped portion 51f to form a stopper which regulate the stroke of the discharge valve 51b.

In a state where there is no difference in fuel pressure between the pressing chamber 4 and a fuel discharge port 2c, the discharge valve 51b is tightly pressed to the discharge valve seat 51a by the urging force of the discharge valve spring 51c, and enters a closed state. When the fuel pressure of the pressing chamber 4 becomes larger than the fuel pressure of the fuel discharge port 2c, the discharge valve 51b starts to open against the discharge valve spring 51c. The fuel in the pressing chamber 4 is discharged at a high pressure to the common rail 108 through the fuel discharge port 2c. When being opened, the discharge valve 51b comes into contact with the discharge valve stopper (the stepped portion 51f), and the step is restricted. Therefore, the step of the discharge valve 51b is appropriately determined by the discharge valve holder 51d. With this configuration, it is possible to prevent that the step becomes so large to delay the close of the discharge valve 51b and thus the fuel discharged at a high pressure to the fuel discharge port 2c flows back into the pressing chamber 4. Therefore, deterioration in efficiency of the high-pressure fuel supply pump 1 can be suppressed. In addition, when the discharge valve 51b repeatedly opens and closes, the discharge valve 51b is guided by the inner peripheral surface of the discharge valve holder 51d so as to move only in the stroke direction. With the configuration described above, the discharge valve mechanism 500 serves as a check valve to restrict the flowing direction of the fuel.

With these configurations, the pressing chamber 4 includes the pump body 1a, the electromagnetic valve mechanism 300, the plunger 5, the cylinder 6, and the discharge valve mechanism 500.

When the plunger 5 moves in the direction of the cam 105 and enters a suction process state while the cam 105 rotates, the volume of the pressing chamber 4 is increased and the fuel pressure in the pressing chamber 4 is lowered. If the fuel pressure in the pressing chamber 4 becomes lower than the pressure of the suction passage 2b in this process, the fuel passes through the suction valve 30 of the opening state, passes through the outer-peripheral passages of a communication hole 6b provided in the pump body 1a and the cylinder 6, and flows into the pressing chamber 4.

After the plunger 5 completes the suction process, the plunger 5 moves to the compression process. Herein, a coil 43 keeps a non-energization state, and a magnetic urging force does not operate. Therefore, the suction valve 30 remains open due to the urging force of a rod urging spring 40. The volume of the pressing chamber 4 is reduced according to the compression movement of the plunger 5. However, in this state, the fuel once sucked into the pressing chamber 4 returns to the suction passage 2b through the suction valve 30 which enters the open state again. Therefore, the pressure of the pressing chamber 4 is not increased. This process is called a return process.

In this state, when a control signal from the ECU 102 is applied to the electromagnetic valve mechanism 300, a current flows through the coil 43, and a rod 35 moves in a direction away from the suction valve 30 by a magnetic urging force, and the suction valve 30 is closed by the urging force by a suction valve urging spring 33 and the fluid force of the fuel flowing into the suction passage 2b. After the valve is closed, the fuel pressure of the pressing chamber 4 increases together with the upward movement of the plunger 5. If the fuel pressure becomes equal to or more than that of the fuel discharge port 2c, the fuel is discharged at a high pressure through the discharge valve mechanism 500, and is supplied to the common rail 108. This process is called a discharge process.

In other words, the compression process of the plunger 5 (the upward process from the lower start point to the upper start point) includes the returning process and the discharge process. Then, the amount of the discharging high-pressure fuel can be controlled by controlling timing for energizing the coil 43 of the electromagnetic valve mechanism 300.

If the timing for energizing the coil 43 is set to be advanced, the ratio of the returning process in the compression process becomes small, and the ratio of the discharge process becomes large. In other words, the fuel returning to the suction passage 2b becomes less, and the discharged high-pressure fuel becomes large. On the other hand, if the energization timing is delayed, the ratio of the return process during the compression process increases, and the ratio of the discharge process decreases. In other words, the fuel returning to the suction passage 2b becomes large, and the discharged high-pressure fuel becomes less. The timing for energizing the coil 43 is controlled by a command from the ECU 102.

With the above configuration, it is possible to control the amount of high-pressure fuel to be discharged as much as the internal combustion engine requires by controlling the timing for energizing the coil 43.

Here, the structure and operation of the electromagnetic valve mechanism 300 of this embodiment will be described in detail with reference to the cross-sectional views of FIGS. 4 to 6 and the timing chart of FIG. 7.

FIG. 4 is a diagram illustrating a state in which no current is supplied to the coil 43 and a state in which the pressure in the pressing chamber 4 (pressure fed by the feed pump 103) is low. In this state, the suction process and the return process are performed. FIG. 5 is a diagram illustrating a state in which the coil 43 is energized, an anchor 36 as a movable part comes into contact with a second core 39 by electromagnetic attraction, and the suction valve 30 is closed. FIG. 6 is a diagram illustrating a non-energized state in which the energization to the coil 43 is released in a state where the suction valve 30 is closed after the pressure in the pressing chamber 4 has sufficiently increased.

As illustrated in FIGS. 4 to 6, the suction valve portion of the electromagnetic valve mechanism 300 includes a suction valve 30, a suction valve seat 31, a suction valve stopper 32, a suction valve urging spring 33, and a suction valve holder 34.

The suction valve seat 31 includes a cylindrical suction valve seat portion 31a on the inner peripheral side in the axial direction, and two or more the radial suction port 31b about the axis of the cylinder, and held to the pump body 1a in the cylindrical surface of the outer periphery with a high pressure.

The suction valve holder 34 includes two or more claws in a radial shape, and the outer peripheral sides of the claws are fitted and held coaxially on the inner peripheral side of the suction valve seat 31. Further, the cylindrical suction valve stopper 32 having a flange shape at one end is held in the cylindrical surface of the inner periphery of the suction valve holder 34 with pressure.

The suction valve urging spring 33 is provided on the inner peripheral side of the suction valve stopper 32, and a part thereof is disposed in the small diameter portion 32c for coaxially stabilizing one end of the suction valve urging spring 33. The suction valve 30 is configured such that the suction valve urging spring 33 is fitted to a valve guide portion 30b provided between the suction valve seat portion 31a and the suction valve stopper 32 and provided at a central portion. The suction valve urging spring 33 is a compression coil spring, and is disposed such that an urging force works in a direction to press the suction valve 30 to the suction valve seat portion 31a. Further, the suction valve urging spring 33 is not limited to the compression coil spring, and any structure may be employed as long as the urging force is obtained. There may be used a plate spring which is integrated with the suction valve 30 and has an urging force.

In this way, with the configuration of the suction valve portion, in the suction process of the pump, the fuel passed the suction port 31b and entered passes between the suction valve 30 and the suction valve seat portion 31a, passes between the outer peripheral side of the suction valve 30 and the claw of the suction valve holder 34, and passes a passage 2h formed in the pump body 1a, the groove 6a of the cylinder 6, and the communication hole 6b, and flows into the pressing chamber 4. In addition, in the discharge process of the pump, the suction valve 30 abuts on and seals the suction valve seat portion 31a. Therefore, the suction valve serves as a check valve which prevents the reverser flow of the fuel to the entrance side.

As illustrated in FIG. 4, a passage 32a is provided to bypass the liquid pressure on the inner peripheral side of the suction valve stopper 32 according to the motion of the suction valve 30 in order to make the motion of the suction valve 30 smooth.

A moving amount 30e of the axial direction of the suction valve 30 is limitedly regulated by the suction valve stopper 32. This is because that, if the moving amount is too large, a back-flow amount is increased by a response delay when the suction valve 30 is closed, and the performance as a pump is lowered. The regulation of the moving amount may be defined by shape dimensions in the axial direction of the suction valve seat portion 31a, the suction valve 30, and the suction valve stopper 32, and the press-fitting position.

An annular projection 32b is provided in the suction valve stopper 32. A contact area with the suction valve stopper 32 becomes small in a state where the suction valve 30 is opened. This is because, at the transition from the opened state to the closed state, the suction valve 30 is easily separated from the suction valve stopper 32, that is, an improvement of a closed-valve responsiveness. In a case where there is no annular projection 32b, that is, in a case where the contact area is large, a large squeeze force works between the suction valve 30 and the suction valve stopper 32, and the suction valve 30 is hardly separated from the suction valve stopper 32.

Since the suction valve 30, suction valve seat 31, and suction valve stopper 32 repeatedly collide with each other during operation, and thus there is used a material obtained by thermally treating martensitic stainless steel which is excellent in high strength, high hardness, and corrosion resistance. However, the invention is not limited to this configuration. Instead, various steel materials such as ferrite-based SUS can be used.

As materials for the suction valve urging spring 33 and the suction valve holder 34, austenitic stainless steel is used in consideration of corrosion resistance.

Next, the solenoid mechanism will be described. The solenoid mechanism is configured by the rod 35, the anchor 36, a spring seat member 37 which is a fixed part, a first core 38, the second core 39, the rod urging spring 40, and an anchor urging spring 41 as illustrated in FIG. 4.

The rod 35 (movable member) and the anchor 36 are configured separately. The rod 35 is slidably held in the axial direction on the inner peripheral side of the spring seat member 37. The outer peripheral side of the anchor 36 is slidably held on the inner peripheral side of the first core 38. In other words, the rod 35 and the anchor 36 both are configured to be slidable in the axial direction within a mechanically regulated range.

The anchor 36 includes one or more through holes (penetration hole) 36a passing through a product in the axial direction in order to freely and smoothly move in the axial direction in the fuel, and extremely excludes the restriction of movement caused by a pressure difference before and after the anchor.

The spring seat member 37 is radially inserted on the inner peripheral side of a hole of the pump body 1a into which the suction valve is inserted. The rod guide abuts on one end of the suction valve seat 31 in the axial direction, and is interposed between the pump body 1a and the first core 38 fixedly welded to the pump body 1a. Similarly to the anchor 36, a through hole 37a passing through in the axial direction is provided even in the spring seat member 37 so as to make the anchor 36 freely and smoothly move and not to allow the pressure of the fuel chamber on the anchor 36 side to hinder the movement of the anchor 36.

The first core 38 is formed such that the shape of a thin cylindrical portion 38b on the opposite side to the portion weld with the pump body 1a becomes a thin cylindrical shape, and is fixedly welded with the second core 39 inserted onto the inner peripheral side.

The rod urging spring 40 is disposed on the inner peripheral side of the second core 39 while guided by a small diameter portion 39a, the tip of the rod 35 comes into contact with the suction valve 30, and the suction valve 30 is applied with an urging force in a direction pulling out of the suction valve seat portion 31a (that is, a valve opening direction of the suction valve). That is, the suction valve 30 is configured separately from the rod 35, and is configured to be restricted from moving in the valve closing direction by contacting one end of the rod 35.

On the second core 39, a magnetic attraction surface 39b facing a magnetic attraction surface 36c of the anchor 36 is formed. The magnetic attraction surface 39b of the second core 39 and the magnetic attraction surface 36c of the anchor 36 are parallel to each other, and a gap 36e is formed between both surfaces when the valve is in an open state. By energizing the coil 43, a magnetic attraction force acts therebetween, and the anchor 36 is attracted to the second core 39 side.

The anchor urging spring 41 has one end inserted into a cylindrical rod insertion portion 37c provided on the center side of the spring seat member 37, and is disposed to apply an urging force in the direction of a rod flange portion 35a with respect to the anchor 36 while maintaining the same axis. A rod insertion hole 37b is formed at the center of the rod insertion portion 37c, and the rod 35 is inserted into the rod insertion hole 37b.

The rod flange portion 35a regulates the relative displacement of the rod 35 with respect to the anchor 36 in the valve opening direction. That is, when the rod 35 is relatively displaced in the valve opening direction with respect to the anchor 36, the rod 35 is engaged with the anchor 36 to form an engaging portion for regulating the relative displacement. The rod 35 is not in contact with the rod insertion hole 37b, and a gap is provided between the outer peripheral surface of the rod 35 and the inner peripheral surface of the rod insertion hole 37b.

A moving amount (the distance of the gap 36e) of the anchor 36 is set to be larger than a moving amount 30e of the suction valve 30. This setting is made to securely close the suction valve 30.

Since the rod 35 and the anchor 36 slide to each other, and the rod 35 repeatedly comes into conflict with the suction valve 30, a material subjected to thermal treatment is used for a martensitic stainless steel in consideration of rigidity and corrosion resistance.

The anchor 36 and the second core 39 are made of a magnetic stainless steel to form a magnetic circuit. Further, the contact surface between the anchor 36 and the second core is treated to improve hardness. Further, the outer peripheral surface of the anchor 36 and the inner peripheral surface of the first core 38 may also be subjected to a surface treatment in order to improve hardness and corrosion resistance. A hard Cr plating may be used for the surface treatment, but not limited thereto.

Austenitic stainless steel is used for the rod urging spring 40 and the anchor urging spring 41 in consideration of corrosion resistance.

One spring 33 is provided in the suction valve portion, and two springs 40 and 41 are provided in the solenoid mechanism section, so that three springs are arranged in the electromagnetic valve mechanism 300. That is, the electromagnetic valve mechanism 300 is provided with the suction valve urging spring 33 disposed in the suction valve portion, and the rod urging spring 40 and the anchor urging spring 41 disposed in the solenoid mechanism unit. In this embodiment, all the springs are configured using the coil springs, but any configuration may be employed as long as an urging force can be obtained.

Next, the configuration of the coil portion will be described. As illustrated in FIG. 4, the coil portion includes a first yoke 42, a coil 43, a second yoke 44, a bobbin 45, a terminal 46, and a connector 47.

The coil 43 bound on the bobbin 45 several times with a copper line is disposed to fall between the first yoke 42 and the second yoke 44, integrally molded and fixed with a connector 47 as a resin member. One end of two terminals 46 is electrically connected to each of both ends of the copper line of the coil. The terminal 46 is molded integrally with the connector 47, and has the other end connected to the engine control unit side.

The coil portion is configured such that a hole of the center portion of the first yoke 42 is press-fitted into and fixed to the first core 38. At this time, the inner peripheral side of the second yoke 44 is configured to come into contact with or to make a slight clearance from the second core 39.

The first yoke 42 and the second yoke 44 are both made of a magnetic stainless material in order to form a magnetic circuit and in consideration of corrosion resistance. The bobbin 45 and the connector 47 are made of a high-strength heat-resistant resin in consideration of strength characteristics and heat-resistant characteristics. The coil 43 is made of copper, and a material made of metal-plated brass is used for the terminal 46.

By configuring the solenoid mechanism and the coil portion as described above, the first core 38, the first yoke 42, the second yoke 44, the second core 39, and the anchor 36 form a magnetic circuit as illustrated by arrows in FIG. 4.

When a current is applied to the coil 43, an electromagnetic force is generated between the second core 39 and the anchor 36, and a force for drawing the anchor 36 toward the second core 39 is generated. In the first core 38, the axial direction portion where the second core 39 and the anchor 36 face each other to generate a suction force is made as thin as possible (the thin cylindrical portion 38b) to increase the magnetic resistance, so that almost all of the magnetic flux can pass between the second core 39 and the anchor 36, and it is possible to efficiently obtain an electromagnetic force. In the thin cylindrical portion 38b, an annular groove may be formed in the axial direction portion where the second core 39 and the anchor 36 face each other, and the thickness may be further reduced to increase the magnetic resistance.

When the electromagnetic force exceeds the valve opening urging force f1 obtained by subtracting the urging force of the anchor urging spring 41 and the urging force of the suction valve urging spring 33 from the urging force of the rod urging spring 40, the anchor 36 as the movable part is pulled together with the rod 35 to the second core 39, and the second core 39 and the anchor 36 can keep in contact.

Hereinafter, the operation of the electromagnetic valve mechanism 300 of the invention and its advantages will be described in detail with reference to the timing chart of FIG. 7.

<<Suction Process>>

In FIG. 7, when the plunger 5 starts lowering from a top dead center TDC, the pressure in the pressing chamber 4 steeply decreases from a high pressure state of, for example, a level of 20 MPa, and the rod 35, the anchor 36, and the suction valve 30 start to move by the valve opening urging force f1 in the valve opening direction of the suction valve 30.

The suction valve 30 is opened. Therefore, the fuel flown from the suction port 31b of the suction valve seat 31 toward the inner peripheral side of the suction valve seat 31 starts to flow into the pressing chamber 4.

The suction valve 30 collides with the suction valve stopper 32, and the suction valve 30 stops at that position. Similarly, the rod 35 stops at the position where the tip contacts the suction valve 30.

The anchor 36 also moves in the valve opening direction of the suction valve 30 at the same speed as the rod 35, but continues to move by inertia even after the rod 35 comes into contact with the suction valve 30 and stops. The movement due to the inertial force is a portion indicated by A in FIG. 7. By the way, the anchor urging spring 41 overcomes the inertia force, and the anchor 36 moves a direction approaching the second core 39 again and can stop at the position where the anchor 36 abuts on the rod flange portion 35a (the opening position of the anchor in FIG. 7). FIG. 4 illustrates a state indicating the positions of the anchor 36, the rod 35, and the suction valve 30 at the time of the stop.

Further, the description has been made such that the rod 35 and the anchor 36 are completely separated in the portion indicated by A in FIG. 7. However, the rod 35 and the anchor 36 may be left in a contact state. In other words, a load operating on the contact between the rod flange portion 35a and the anchor 36 is reduced after the rod 35 stops the operation. If the load becomes 0, the anchor 36 starts to separate from the rod 35, but the urging force of the anchor urging spring 41 may be set to leave a slight load without setting to 0.

When the suction valve 30 comes into conflict with the suction valve stopper 32, there occurs a noise problem which is an important characteristic as a product. The magnitude of the abnormal noise depends on the magnitude of the energy at the time of the collision. However, the rod 35 and the anchor 36 are configured separately. Therefore, the energy colliding with the suction valve stopper 32 is generated only by the mass of the suction valve 30 and the mass of the rod 35. That is, since the mass of the anchor 36 does not contribute to the collision energy, the noise level can be reduced by configuring the rod 35 and the anchor 36 separately.

The holding method (supporting method) of the anchor 36 in the radial direction includes a method for maintaining a clearance between the inner diameter of the anchor 36 and the outer diameter of the rod 35, and a method for maintaining the clearance between the outer diameter of the anchor 36 and the inner peripheral surface of the first core 38. In this embodiment, the outer diameter of the anchor 36 and the inner peripheral surface of the first core 38 are used as sliding surfaces, so that the radial position of the anchor 36 is maintained.

Even after the suction valve 30 is opened, the plunger 5 continues to descend further and reaches a bottom dead center BDC. During this time, the fuel continues to flow into the pressing chamber 4. This process is a suction process.

<<Return Process>>

In FIG. 7, the plunger 5 that has descended to the bottom dead center BDC enters an upward process. The suction valve 30 is kept stopped in the open state by an electromagnetic force exceeding the valve opening urging force f1, and the direction of the fluid passing through the suction valve 30 is reversed. In other words, in the suction process, the fuel flows from the suction port 31b into the pressing chamber 4, and returns to the direction from the pressing chamber 4 to the suction port 31b at the time point of the upward process. This process is called a return process.

<<Transition State from Return Process to Discharge Process>>

In FIG. 7, an attraction current is supplied to the coil 43 at an earlier time in consideration of the generation delay of the electromagnetic force and the closing delay of the suction valve 30 from a desired discharge time, a magnetic attraction force works between the anchor 36 and the second core 39. The attraction current is a current of a magnitude necessary to generate a magnetic attraction force that overcomes the valve opening urging force f1. The anchor 36 starts to move in the direction of the second core 39 at time when the magnetic attraction force overcomes the valve opening urging force f1.

As the outer peripheral surface of the anchor 36 slides and moves on the inner peripheral surface of the first core 38, the rod 35 that is in contact with the rod flange portion 35a in the axial direction also moves, and the suction valve 30 receives a force of the suction valve urging spring 33 and starts to be closed. At this time, a hydrostatic force, mainly a static pressure due to the flow rate of the fuel passing through the seat from the pressing chamber 4 side decreases.

As described above, in this embodiment, the anchor 36 is configured to move in the axial direction of the rod 35 with the inner peripheral surface 38a of the first core 38 serving as a guide surface. For this reason, the gap between the outer peripheral surface of the anchor 36 and the inner peripheral surface 38a of the first core 38 is very small, so that a very large fluid resistance is applied to the fuel flow flowing through this gap.

In this embodiment, the anchor 36 and the first core 38 are configured to contact and slide, and the rod 35 is configured to abut on the penetration hole 36b of the anchor 36 and slide. That is, the rod 35 is guided by the penetration hole 36b of the anchor 36, and is configured to be relatively displaceable with respect to the anchor 36. Therefore, a gap is provided between the inner peripheral surface of the rod insertion hole 37b of the spring seat member 37 and the outer peripheral surface of the rod 35.

The suction valve 30 which starts to move comes into conflict with the suction valve seat portion 31a and stops, and enters the closed state. If the valve is closed, the pressure in the cylinder is increased rapidly. Therefore, the suction valve 30 is pressed from the inside of the cylinder with a force extremely larger than the valve opening urging force f1 in the closing direction, and starts to keep the closed state.

Even the anchor 36 comes into conflict with the second core 39 and stops. The rod 35 keeps moving by inertia even after the anchor 36 stops. However, the urging force of the rod urging spring 40 overcomes the inertia force and returns, and the flange 35a returns to the contact position with respect to the anchor 36.

When the anchor 36 comes into conflict with the second core 39, there occurs a noise problem which is an important characteristic as a product. The noise becomes larger than the noise generated when the suction valve 30 and the suction valve stopper 32 collide. However, as described above, since the rod 35 and the anchor 36 are configured separately, energy that collides with the second core 39 is generated only by the mass of the anchor 36. In other words, the mass of the rod 35 does not contribute to the collision energy. Therefore, it is possible to reduce the noise problem by providing the rod 35 and the anchor 36 separately.

After the anchor 36 comes into contact with the second core 39, a sufficient magnetic attraction force is generated by the contact. Therefore, in the coil 43, a small current value (holding current) can be kept only by keeping the contact.

Herein, the description will be given about a corrosion problem which may be caused in the solenoid mechanism.

If the flow path through which fuel flows between the anchor 36 and the first core 38 is configured, when current is applied to the coil 43 and the anchor 36 is drawn to the second core 39, the volume of space between the anchor 36 and the second core 39 is rapidly reduced. Therefore, the fluid in the space loses a place to flow, is flushed toward the outer peripheral side of the anchor 36 with a fast flow, and collides with the thin cylindrical portion 38b of the first core 38. There is a concern that erosion may occur in the thin cylindrical portion 38b of the first core 38 due to the energy of the collision of the fuel flow. Further, the flushed fluid passes through the outer periphery of the anchor 36 and flows to the spring seat member 37 side. At this time, the flow rate increases due to the narrow flow path on the outer peripheral side of the anchor 36, and cavitation occurs due to a rapid decrease in static pressure, and erosion due to cavitation occurs in the thin cylindrical portion 38b of the first core 38.

This cavitation erosion can be solved in this embodiment for the following reasons.

In this embodiment, since the outer periphery of the anchor 36 and the inner peripheral portion of the first core 38 form a sliding portion, the clearance is about 5 μm to 10 μm in diameter difference. On the other hand, one or more axial direction through holes 36a are provided on the center side of the anchor 36. The through hole 36a penetrates the anchor 36 in the central axis direction (the axial direction of the rod 35), and forms a fuel passage communicating the space (fuel chamber) on the second core 39 side and the space (fuel chamber) on the spring seat member 37 side with respect to the anchor 36. When the anchor 36 is drawn toward the second core 39, most of the fluid in the space between the anchor 36 and the second core 39 passes through the through hole 36a without passing through the narrow passage on the outer peripheral side of the anchor 36. Then, the fluid moves to the fuel chamber formed between the anchor 36 and the spring seat member 37. With this configuration, erosion of the thin cylindrical portion 38b of the first core 38 can be avoided.

Even when the anchor 36 and the rod 35 are integrally formed, the above problem can be solved by optimizing the capacity of the through hole 36a of the anchor 36. The through hole 36a of the anchor 36 may be configured so that its fluid resistance is smaller than the fluid resistance in the gap between the outer peripheral surface of the anchor 36 and the inner peripheral surface of the first core 38. Then, the through hole 36a of the anchor 36 may be provided radially inward (center side) of the outer peripheral surface of the anchor 36. For example, grooves may be provided on the inner peripheral surface of the penetration hole 36b through which the rod 35 is inserted at gaps in the circumferential direction. Alternatively, a configuration in which the outer peripheral surface of the rod 35 does not slide in the through hole 36a of the anchor 36 may be adopted. In this case, the rod 35 may slide on the inner peripheral surface of the rod insertion hole 37b of the spring seat member 37. That is, the spring seat member 37 is preferably configured as a rod guide.

When the anchor 36 and the rod 35 are integrally formed, at the time of a high-speed rotation of the engine (that is, a condition that the ascending speed of the plunger 5 is large), the current is applied to the coil 43, a force of closing the suction valve 30 caused by the fluid of a significantly large speed is increasingly added to the force of moving the anchor 36 to the second core 39. The rod 35 and the anchor 36 approach the second core 39 rapidly. Therefore, the speed at which the fluid in the space is extruded further increases. Therefore, the problem of erosion can be solved by increasing the capacity of the through hole 36a of the anchor 36, that is, increasing the number of holes or increasing the diameter of the hole.

As described above, the adverse effects of the separated configuration of the anchor 36 and the rod 35 contain a problem that a desired magnetic attraction force is not obtained, the noises, and the drop in performance. However, these adverse effects can be canceled by providing the anchor urging spring 41.

<<Discharge Process>>

In FIG. 7, the plunger 5 transitions to the upward process from the bottom dead center BDC, the current (attraction current and holding current) is applied to the coil 43 at a desired timing, the pressure in the pressing chamber 4 is rapidly increased immediately after the end of the returning process until the suction valve 30 is closed, and transitions to the discharge process. After the discharge process, it is desirable that the power applied to the coil be reduced from a viewpoint of power saving, thus the current applied to the coil 43 is interrupted. The electromagnetic force is not added, the anchor 36 and the rod 35 move in a direction away from the second core 39 by a resultant force of the rod urging spring 40 and the anchor urging spring 41. However, the suction valve 30 is at the closed position by a strong closing force, so that the rod 35 stops at a position where the valve comes into conflict with the suction valve 30 of the closed state.

The rod 35 and the anchor 36 start to move at the same time after the current interruption. However, even after the rod 35 stops in a state where the tip of the rod 35 and the closed suction valve 30 are in contact, the anchor 36 continues to move to the direction of the suction valve 30 by inertia. This state is the state of B in FIG. 7.

However, the anchor urging spring 41 overcomes the inertia force, and an urging force is applied to the anchor 36 in the direction of the second core 39. Therefore, the anchor 36 can stop in the state (the state of FIG. 6) where the anchor comes into contact to the flange 35a of the rod 35.

In this way, the discharge process where the fuel is discharged is performed, and the suction valve 30, the rod 35, and the anchor 36 enter the state of FIG. 6 immediately before the next suction process.

The discharge process ends at the time when the plunger 5 reaches the top dead center TDC, and the suction process starts again.

Thus, it is possible to provide a high-pressure fuel supply pump which presses a necessary amount of the fuel guided to the low-pressure fuel suction port 2a to a high pressure by the reciprocation of the plunger 5 in the pressing chamber 4 of the pump body 1a, and is suitable to pump the fuel from the fuel discharge port 2c to the common rail 108.

In recent years, the high-pressure fuel supply pump 1 has been required to be further increased in pressure. In the future, a pump capable of withstanding a high pressure of 30 MPa or more in target discharge pressure will be required. In addition, it is required to cope with diversification of fuels such as biofuels (alcohol, methanol and the like) and fuels having a high oil content of biofuels.

When the target discharge pressure becomes extremely high as described above, or when various fuels are used for the high-pressure fuel supply pump 1, erosion due to cavitation becomes a problem.

In particular, in the case of biofuel, erosion due to cavitation is accelerated as compared with gasoline alone since corrosion loss occurs due to its own corrosive action.

Therefore, it is necessary to suppress the progress of the cavitation erosion, to reduce the probability of the occurrence of the cavitation erosion, or to prolong the time until the cavitation erosion occurs.

Figure 8:
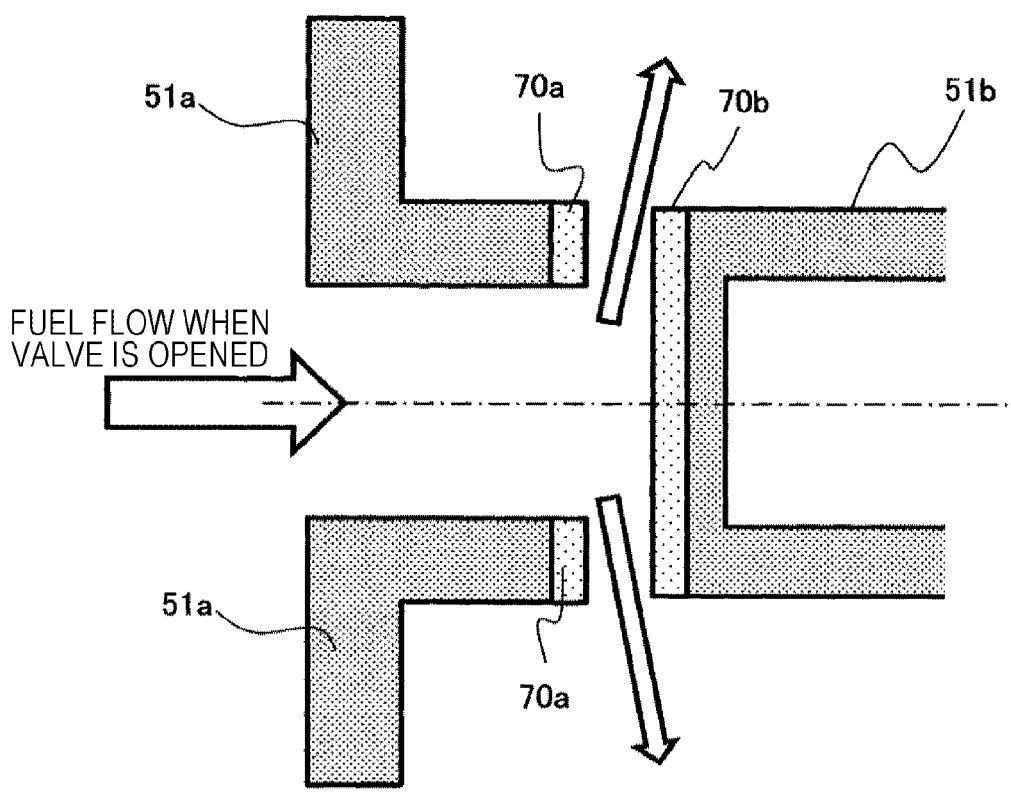
FIG. 8 is a schematic cross-sectional view of a valve portion when a fuel flow path material according to the first embodiment of the invention is applied to the high-pressure fuel supply pump.
Figure 9:
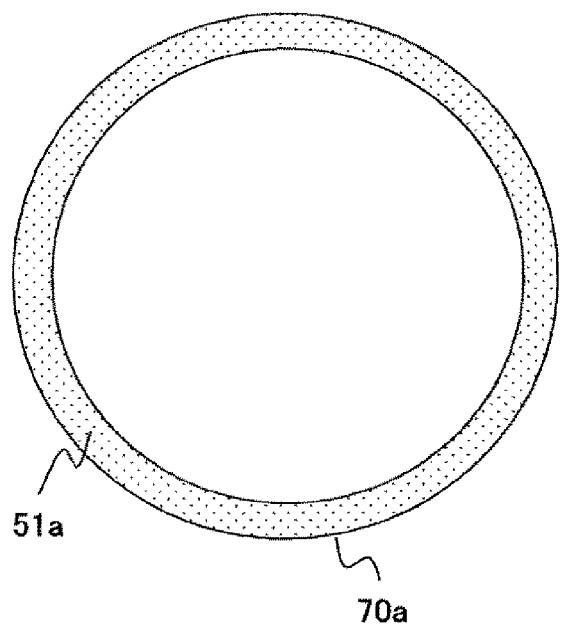
FIG. 9 is a schematic plan view of a discharge valve seat of a discharge valve mechanism according to the first embodiment of the invention.
Figure 10:
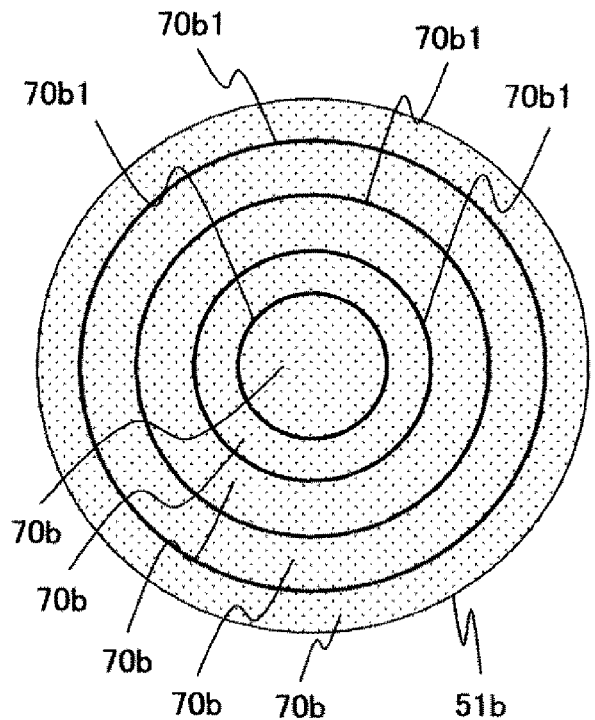
FIG. 10 is a schematic plan view of a discharge valve of the discharge valve mechanism according to the first embodiment of the invention.
Figure 11:
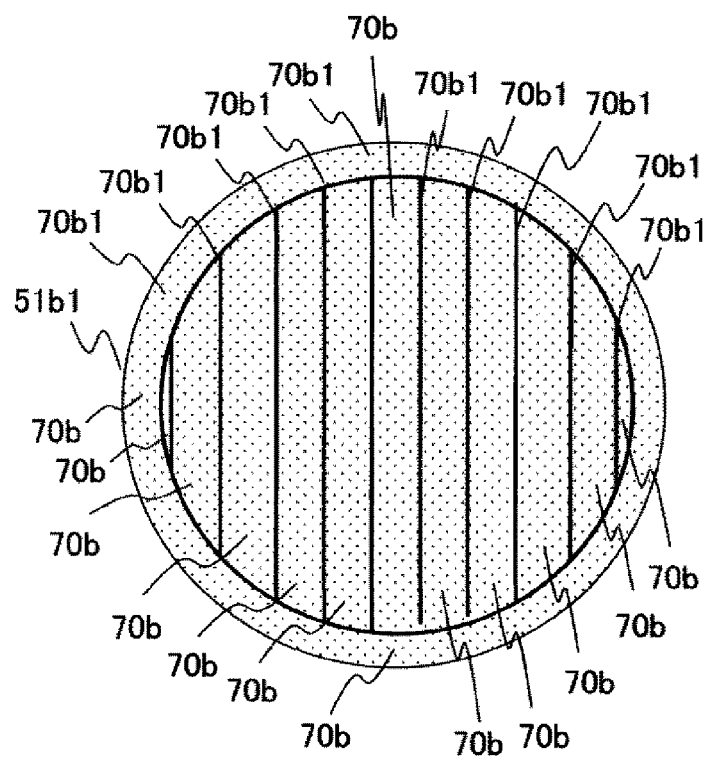
FIG. 11 is a schematic plan view of another type of the discharge valve of the discharge valve mechanism according to the first embodiment of the invention.
Figure 12:
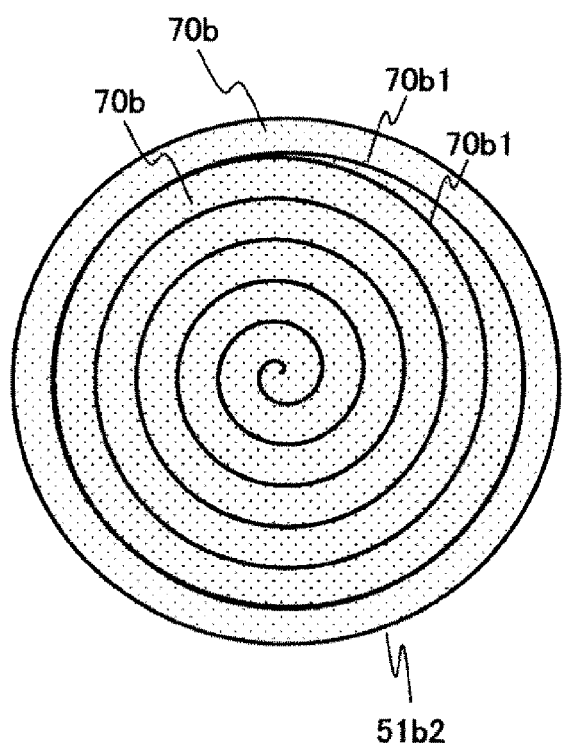
FIG. 12 is a schematic plan view of another type of the discharge valve of the discharge valve mechanism according to the first embodiment of the invention.

The inventors of the invention have studied and found that cavitation erosion particularly occurs in the valve portion where the valve and the valve seat are in contact with each other. A configuration for suppressing this will be described below with reference to FIGS. 8 to 12. FIG. 8 is a diagram illustrating a cross section of a valve portion to which the surface treatment layer of the invention is applied, and is a diagram illustrating a flow direction of fuel when the valve is opened. FIG. 9 is a schematic plan view of a discharge valve seat of the discharge valve mechanism, and FIG. 10 is a schematic plan view of a discharge valve of the discharge valve mechanism. FIGS. 11 and 12 are schematic plan views of other types of the discharge valve seat of the discharge valve mechanism.

In FIGS. 8 to 12, the case where a Co-based alloy layer 70$b$ and a Cr-enriched portion 70$b$1 are formed on the surface of the discharge valve 51$b$ and the discharge valve seat 51$a$ opposed to the discharge valve 51$b$ will be described. Since the surface of the relief valve 61 of the relief valve mechanism 600 and the surface of the relief valve seat 63 facing the relief valve 61 may cause cavitation erosion similarly to the discharge valve 51$b$ and the discharge valve seat 51$a$, the Co-based alloy layers 70$a$ and 70$b$ and the Cr-enriched portion 70$b$1 can be formed as illustrated in FIGS. 9 and 10 described below. Further, the Co-based alloy layers 70$a$ and 70$b$ and the Cr-enriched portion 70$b$1 can also be formed on the surface of the suction valve 30 and the surface of the suction valve seat portion 31$a$ of the suction valve seat 31 facing the suction valve 30.

As illustrated in FIG. 8, the right end of the fixed discharge valve seat 51$a$ is in contact with the movable discharge valve 51$b$. Further, since the fuel undergoes pressure fluctuation near the right end of the discharge valve seat 51$a$, cavitation occurs on the right end surface of the discharge valve seat 51$a$, and erosion (corrosion) may occur due to collapse of the cavitation.

Further, when a highly corrosive fuel such as an alcohol fuel passes therethrough, a corrosive reaction due to an electrochemical action due to components in the alcohol particularly occurs on the surface of the discharge valve 51$b$, and may occur locally reduced thickness so-called pitting.

Therefore, as illustrated in FIGS. 8 and 9, the Co-based alloy layer 70$a$ having a high hardness is formed by work hardening on a surface portion of the discharge valve seat 51$a$ in contact with the discharge valve 51$b$.

Similarly, as illustrated in FIG. 8, among the discharge valves 51$b$, the Co-based alloy layer 70$b$ having high hardness is formed by hardening at a contact portion with the discharge valve seat 51$a$. As illustrated in FIG. 10, a plurality of Cr-enriched portions 70$b$1 having a Cr concentration higher than that of the surrounding Co-based alloy layer 70$b$ are formed in a substantially concentric shape on the surface of the discharge valve 51$b$, so that cavitation resistance is ensured.

The Co-based alloy layer 70$a$ of the discharge valve seat 51$a$ and the Co-based alloy layer 70$b$ on the surface of the discharge valve 51$b$ as illustrated in FIGS. 8 to 10 are made by laser overlay welding a Co-based alloy on the surface of a steel material forming the discharge valve seat 51$a$ and the discharge valve 51$b$ such as SUS304.

After performing the laser overlay welding process, for example, polishing is performed to form the surface roughness Rz by 0.3 μm or less, so that a Co-based alloy layer formed at the overlay beat boundary during laser overlay welding Cr-enriched portions 70$b$1 having a higher Cr content than 70$b$ are exposed on the surface in a plurality of circumferential shapes having different diameters (see FIG. 10). Corrosion resistance is ensured by the Cr-enriched portion 70$b$1.

As described above, by sharing the functions of cavitation resistance and corrosion resistance on the surface of the valve portion, it is possible to provide the high-pressure fuel supply pump 1 having both characteristics.

The layer formed by laser overlaying has a columnar structure with respect to a planar structure, and thus has an advantage that there is less wall thinning due to cavitation compared to a surface treatment film formed in a layered form such as a plating film.

The formed Cr-enriched portion 70$b$1 is confirmed by the present inventors' investigation (observation by SEM-EDX) that Cr is concentrated from 15% to 40% compared to the Cr concentration of the Co-based alloy layer 70$b$. In the obtained Cr-enriched portion 70$b$1, only fine grain boundary carbides have not been observed, and it can be inferred that the anticorrosion performance is obtained by being present as Cr metal.

Further, in FIG. 10, the case where the Cr-enriched portion 70$b$1 is formed on the surface of the discharge valve 51$b$ so as to have a circular shape has been described, but as illustrated in FIG. 11, the laser overlay welding is performed linearly except the outermost peripheral portion serving as the contact portion with the discharge valve seat 51$a$, so that the discharge valve 51$b$1 can be obtained in which the Co-based alloy layer 70$b$ and the Cr-enriched portion 70$b$1 are linearly formed. In addition to this, as illustrated in FIG. 12, except for the outermost peripheral portion which is a contact portion with the discharge valve seat 51$a$, the laser overlay welding is performed spirally so that the discharge valve 51$b$2 can be obtained in which the Co-based alloy layer 70$b$ and the Cr-enriched portion 70$b$1 are formed in a spiral shape. Furthermore, the shape of the Cr-enriched portion is not particularly limited as long as the corrosion resistance can be maintained even if the shape is other.

Here, as illustrated in FIGS. 10 to 12, like the discharge valves 51$b$, 51$b$1 and 51$b$2, it is desirable that the outermost peripheral portion which is in contact with the discharge valve seat 51$a$ has no Cr-enriched portion 70$b$1 formed thereon but has a structure configured only by the Co-based alloy layer 70$b$. As described above, by forming the contact portions of the discharge valves 51$b$, 51$b$1, 51$b$2 with the discharge valve seat 51$a$ only with the Co-based alloy layer 70$b$, the valve characteristics can be reliably ensured.

FIG. 9 illustrates a case where no Cr-enriched portion is formed in the Co-based alloy layer 70$a$ of the discharge valve seat 51$a$, but the surface of the Co-based alloy layer 70$a$ of the discharge valve seat 51$a$ may also have a Cr-enriched portion. In this case, as in the case of laser overlay welding on the surface of the discharge valve 51$b$, the overlay layers are formed by laser overlaying or the like, and then polished to expose the Cr-enriched layer on the surface.

As described above, the discharge valve 51$b$ and the discharge valve seat 51$a$ manufactured using SUS304in which Stellite #6 and Stellite #1 are overlaid by laser overlay welding are incorporated into the high-pressure fuel supply pump 1, and whether cavitation erosion is generated has been securely experimented. In order to compare the film formed by laser overlay welding with a Co-based alloy not subjected to overlay welding, a part has been manufactured using a commercially available Stellite #6 single material, and a comparative confirmation experiment has been performed in the same manner.

Figure 13:
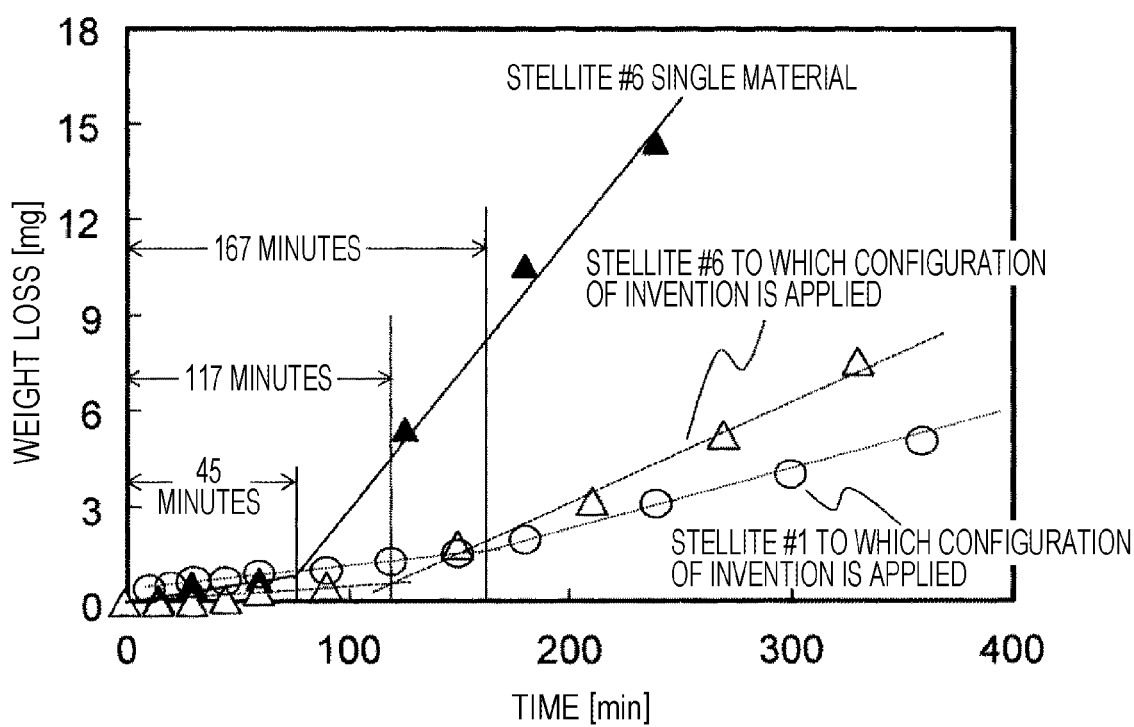
FIG. 13 is a diagram illustrating the results of a cavitation test illustrating the effect of the configuration of the invention.

FIG. 13 is a diagram illustrating the results of an experiment performed to quantitatively illustrate the degree of cavitation erosion resistance of a material or its configuration against cavitation erosion according to the invention. The vertical axis indicates the amount of cavitation erosion, and the horizontal axis indicates the time of cavitation. In the test, pure water has been used as a solvent.

As illustrated in FIG. 13, in Stellite #6 and a single material obtained by performing laser overlay welding on SUS304 material and Stellite #6, where the structure of the invention is applied, a period having no mass loss called an incubation period in the cavitation erosion phenomenon is 117 minutes for the former and 45 minutes for the latter.

In the high-pressure fuel supply pump 1, if cavitation erosion occurs after the incubation period, oil tightness and the like cannot be maintained. Therefore, even if cavitation erosion occurs, it is necessarily kept within the incubation period. Therefore, the standard of the cavitation-resistant erosion material in the high-pressure fuel supply pump 1 is the length of the incubation period.

Stellite #6 to which the configuration of the invention is applied as described above has a longer incubation period of the cavitation erosion phenomenon than the commercially available Stellite #6 single material. In the actual high-pressure fuel supply pump 1 described above, the reason why the generation amount of cavitation erosion of the pump to which the invention is applied is reduced is presumed that the configuration in which the Co-based alloy layer 70b and the Cr-enriched portion 70b1 of the invention are mixed is effective.

In addition, as illustrated in FIG. 13, it has been found that the incubation period of Stellite #1 to which the configuration of the invention is applied is 167 minutes, which is longer than that of Stellite #6 to which the configuration of the invention is applied. This difference between Stellite #1 and Stellite #6 is considered to be due to the difference in the content of W (tungsten). In addition to the Cr-enriched portion 70b1 formed on the surface, it is assumed that the amount of Cr+Co and Cr+Co+W is large.

From these results, it is found that the presence of the Cr-enriched portion 70b1 as in the invention results in a surface treatment film having both corrosion resistance and cavitation resistance.

Next, the corrosion resistance of the configuration of the invention has been evaluated. The measuring device is configured by a potentiostat, a temperature controller, a recorder, a reaction tank, and a heater. While injecting artificial seawater into the reaction tank of such a measuring device, the metal material substrate to be evaluated (here, a SUS304 substrate with laser overlay welding of Stellite #1 to which the configuration of the invention is applied, and a SUS440C substrate as a comparative material) is immersed in artificial seawater together with a reference electrode, a counter electrode of Pt, and a thermocouple. The pitting potential (Vvs. Ag/AgCl) is obtained using a potassium chloride saturated aqueous solution silver/silver chloride electrode as a reference electrode. The results are illustrated in Table 1.

TABLE 1

|  | Pitting Potential (V vs. Ag/AgCl) |
|---|---|
| Stellite #1 Laser Overlay Welding SUS304 where Structure of Invention is Applied | 0.133 |
| Comparative Example (SUS440C) | 0.065 |

As illustrated in Table 1, the pitting potential of Stellite #1 laser overlay welding substrate to which the configuration of the invention is applied is 0.133 V, whereas the pitting potential of the comparative example (SUS440C) is 0.065 V. It has been confirmed that the configuration of the invention also have excellent corrosion resistance.

In this way, compared to the part (discharge valve, discharge valve seat) of Stellite #6 single material in which the Cr-enriched portion is not formed, it has been confirmed that Stellite #6 material or Stellite #1 material having the Cr-enriched portion by laser overlaying have low cavitation erosion, and excellent durability.

The high-pressure fuel supply pump of this embodiment is suitably applied to gasoline or biofuel, but in another verification, cavitation erosion with water, gasoline, and ethanol corresponding to biofuel is the same as a phenomenon. It has been confirmed that the result of the comparison of the material strength does not change even if water is used instead of gasoline.

Next, a method of manufacturing the high-pressure fuel supply pump according to this embodiment will be described.

First, the components described with reference to FIGS. 1 to 6 which form the high-pressure fuel supply pump 1 are prepared. Among the components forming the high-pressure fuel supply pump 1, each component other than the discharge valve seat 51a and the discharge valve 51b, the relief valve 61, the relief valve seat 63, the suction valve 30, and the suction valve seat 31 can be prepared by various known methods according to the specifications. The discharge valve 51b and the discharge valve seat 51a are manufactured by a method described below. Hereinafter, the case of the discharge valve 51b and the discharge valve seat 51a will be described, but the same applies to the relief valve 61 and the like.

First, the discharge valve seat 51a and a discharge valve 51b are prepared. The base material of the discharge valve seat 51a and the discharge valve 51b is a steel material. As the steel material, for example, martensitic stainless steel such as SUS420J2 or SUS440C is suitable. The prepared base material is processed into a shape of the discharge valve seat 51a and the discharge valve 51b by a known method.

Thereafter, the Co-based alloy layer 70a is formed by laser overlay welding on a surface portion of the discharge valve seat 51a in contact with the discharge valve 51b. Similarly, the Co-based alloy layer 70b is formed by laser overlay welding on the surface of the discharge valve 51b where the fuel contacts. At this time, the laser overlay welding is performed so that the Co-based alloy layer 70b is formed on the surface of the discharge valve 51b in contact with the discharge valve seat 51a. In addition, the laser overlay welding is performed on the surface of the discharge valve 51b where the fuel collides, so as to draw any one of a circumferential shape, a linear shape, and a spiral shape.

As a method for forming the surface treatment layer by laser overlay welding, preferably, powder, rod, or wire of Stellite (registered trademark) #1 or powder, rod, or wire of Stellite #6 is supplied, and while controlling the amount of input heat, the build-up welding for melting and solidifying is performed so as to overlap the adjacent build-up layer by ⅓ or more over the entire surface of the discharge valve 51b.

Next, the surfaces of the formed Co-based alloy layers 70a and 70b are polished. Thereby, the Cr-enriched portion 70b1 is exposed on the surface of the Co-based alloy layer 70b in a circumferential, linear, or spiral shape.

Next, the components including the prepared discharge valve 51b and the discharge valve seat 51a are assembled, and after a finished product is appropriately inspected, the process proceeds to a step of incorporating the high-pressure fuel supply pump.

Next, the effects of this embodiment will be described.

The high-pressure fuel supply pump 1 according to the first embodiment of the invention includes the discharge valve 51b for discharging fuel, the relief valve 61, and the suction valve 30, the discharge valve seat 51a on which the discharge valve 51b, the relief valve 61, and the suction valve 30 are seated, the relief valve seat 63, and the suction valve seat 31. The base of the discharge valve 51b, the discharge valve seat 51a, and the like is a steel material. In the surfaces of the discharge valve 51b, the relief valve 61, and the suction valve 30, the Co-based alloy layer 70b and the Cr-enriched portion 70b1 having a higher Cr concentration than the surrounding Co-based alloy layer 70b are formed. In the surfaces of the discharge valve seat 51a, the relief valve seat 63, and the suction valve seat 31, the Co-based alloy layer 70a is formed.

As described above, in the high-pressure fuel supply pump 1, a material that causes cavitation erosion or that progresses slowly is applied to the surface portion of the discharge valve 51b that has a lot of contact with the liquid fuel, so that it is possible to increase the fuel pressure and the flow rate than now. In addition, even when using biofuels (alcohol, methanol, etc.) or fuels with a high oil content of biofuels, cavitation erosion and corrosion can be suppressed in the same manner as when using fuels derived from mineral oil, and long-term reliability can be ensured. Therefore, it is possible to suitably cope with diversification of fuel.

Further, since the Cr-enriched portion 70b1 is enriched from 15% to 40% with respect to the Cr concentration of the Co-based alloy layer 70b, the high-pressure fuel supply pump 1 has high corrosion resistance.

Further, since the contact portion between the discharge valve 51b and the discharge valve seat 51a is made of the Co-based alloy layers 70a and 70b, high cavitation resistance can be secured.

Further, the Cr-enriched portion 70b1 is formed in a circumferential shape with respect to the Co-based alloy layer 70b, particularly in a circumferential shape having a plurality of different diameters, so that the Cr-enriched portion 70b1 can be provided on the surface of the discharge valve seat 51a without uneven distribution, and the high-pressure fuel supply pump 1 having high corrosion resistance can be obtained.

Further, the Cr-enriched portion 70b1 can be provided without uneven distribution of the Cr-enriched portion 70b1 on the surface of the discharge valve seat 51a by being formed linearly or spirally with respect to the Co-based alloy layer 70b. The high-pressure fuel supply pump 1 having high corrosion resistance can be obtained.

Further, the Co-based alloy layer 70b is formed by laser overlay welding, particularly by forming a new overlay layer so as to overlap the adjacent overlay layer, so that the Cr-enriched portion 70b1 becomes uneven on the surface of the discharge valve seat 51a. The high-pressure fuel supply pump 1 having high corrosion resistance can be obtained.

In this embodiment, the case where the Co-based alloy layer or the Cr-enriched portion is formed on the surface of the valve and the valve seat by performing the laser overlay welding a plurality of times has been described, but the invention is not limited thereto. It may be manufactured using various other welding methods or other methods. However, instead of the method for forming the Co-based alloy layer on the surface of the valve and the valve seat at one time, coating the Co-based alloy a plurality of times is desirable to adopt a method for covering over the entire surface in order to surely form the Cr-concentrated layer.

Further, the case where Stellite #1 material containing about 30% Cr and Stellite #6 material containing about 28% are coated by laser overlay welding has been described, but the material used is not limited to Stellite #1 or Stellite #6. A known Co-based alloy containing Cr can be used. The laser overlay welding or the like can be performed while simultaneously supplying separate Cr and Co materials.

Second Embodiment

Figure 14:
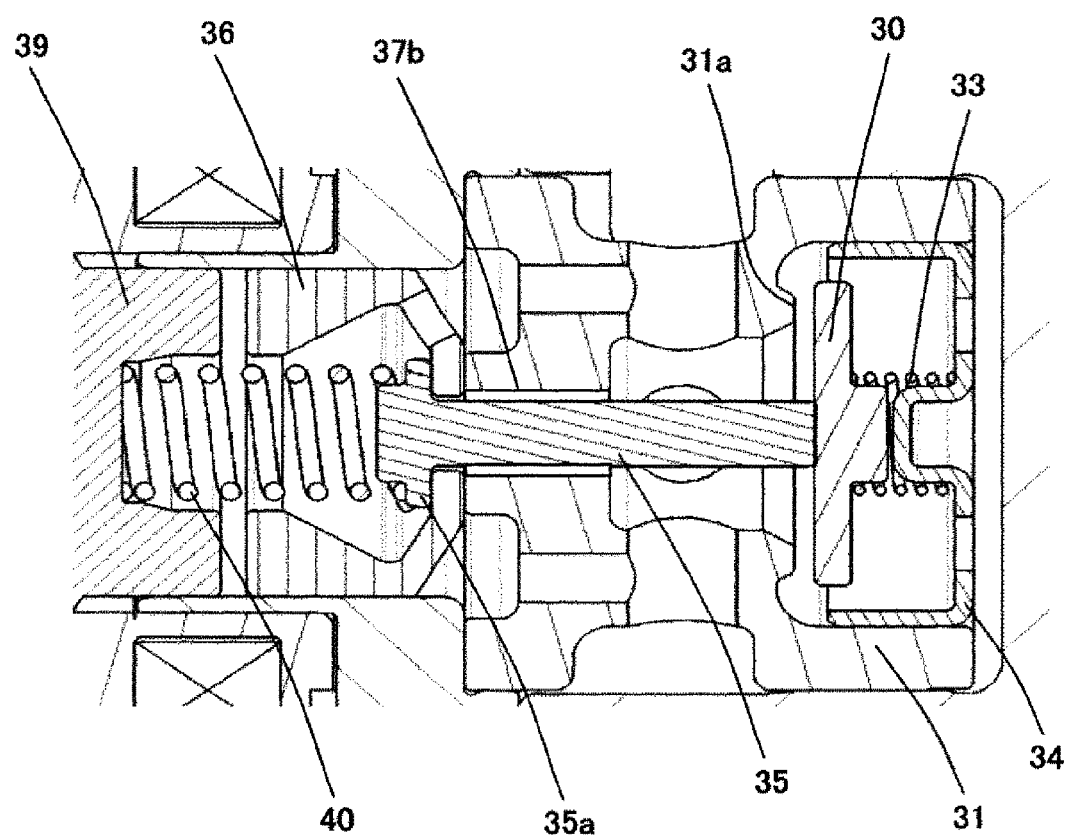
FIG. 14 is a cross-sectional view of an electromagnetic suction valve of a high-pressure fuel supply pump according to a second embodiment of the invention.

A high-pressure fuel supply pump and a method of manufacturing a high-pressure fuel supply pump according to a second embodiment of the invention will be described with reference to FIG. 14. FIG. 14 is a diagram illustrating a suction valve portion of the high-pressure fuel supply pump according to the second embodiment. The same configurations as those of the first embodiment will be attached with the same symbol, and the description thereof will be omitted.

The suction valve portion illustrated in FIG. 14 has a structure without an anchor urging spring 41 for urging the anchor 36 as illustrated in FIGS. 5 and 6.

The structure and operation other than the anchor urging spring 41 are, for example, a structure in which the outer periphery of the anchor 36 is held by the inner periphery of the first core 38 as in the first embodiment, and the operation and the effects are the same as those of the electromagnetic valve mechanism 300 illustrated in the first embodiment.

Further, the other configuration is substantially the same as the configuration and operation of the high-pressure fuel supply pump and the method of manufacturing the high-pressure fuel supply pump of the first embodiment described above, and the details are omitted.

The high-pressure fuel supply pump and the method of manufacturing the high-pressure fuel supply pump according to the second embodiment of the invention also have substantially the same effects as the high-pressure fuel supply pump and the method of manufacturing the high-pressure fuel supply pump according to the first embodiment.

<Others>

Further, the invention is not limited to the above embodiments, and various modifications may be contained.

The above-described embodiments have been described in detail for clear understating of the invention, and are not necessarily limited to those having all the described configurations.

REFERENCE SIGNS LIST 1 high-pressure fuel supply pump
1a pump body
300 electromagnetic valve mechanism
30 suction valve 31 suction valve seat
31a suction valve seat portion
500 discharge valve mechanism
51a discharge valve seat
51b, 51b1, 51b2 discharge valve
600 relief valve mechanism
61 relief valve
63 relief valve seat
70a Co-based alloy layer
70b Co-based alloy layer
70b1 Cr-enriched portion

The invention claimed is:

1. A high-pressure fuel supply pump, comprising:
a valve that discharges fuel; and
a valve seat on which the valve sits,
wherein a base material of the valve and the valve seat is a steel material,
wherein, on the surface of the valve, a first Co-based alloy layer is formed and thereon a Cr enriched first portion of said first Co-based alloy layer is formed, said Cr enriched first portion having a Cr concentration higher than a second portion of the Co-based alloy layer that surrounds said Cr enriched portion of said first Co-based alloy layer, and
wherein a second Co-based alloy layer is formed on a surface of the valve seat.

2. The high-pressure fuel supply pump according to claim 1, wherein the Cr enriched portion is enriched from 15% to 40% with respect to the Cr concentration of the first Co-based alloy layer.

3. The high-pressure fuel supply pump according to claim 1, wherein a portion of the valve that contacts the valve seat is formed of the first Co-based alloy layer.

4. The high-pressure fuel supply pump according to claim 1, wherein the Cr enriched portion is formed circumferentially with respect to the first Co-based alloy layer.

5. The high-pressure fuel supply pump according to claim 4, wherein a plurality of circularly shaped Cr enriched portions of said first Co-based alloy layer are formed having a plurality of different diameters.

6. The high-pressure fuel supply pump according to claim 1, wherein the Cr enriched portion is formed linearly or spirally with respect to the first Co-based alloy layer.

7. The high-pressure fuel supply pump according to claim 1, wherein the valve is any one of a discharge valve that discharges fuel from a pressing chamber, a suction valve that sucks the fuel into the pressurized chamber, and a relief valve that is opened to release high-pressure fuel when fuel on a discharge side of the pressurized chamber becomes a set value or more.

8. A method of manufacturing a high-pressure fuel supply pump which includes a valve for discharging fuel and a valve seat on which the valve is seated, comprising:
where a base material of the valve and the valve seat is a steel material,
forming a first Co-based alloy layer on a surface of the valve and a second Co-based alloy layer on a surface of the valve seat,
forming a Cr-enriched portion on said first Co-based alloy layer, the Cr-enriched portion having a higher Cr concentration than a second portion of the Co-based alloy layer that surrounds said Cr-enriched portion; and
polishing a surface of the formed Co-based alloy layer.

9. The method of manufacturing a high-pressure fuel supply pump according to claim 8, wherein the first Co based alloy layer is formed by laser overlay welding.

10. The method of manufacturing a high-pressure fuel supply pump according to claim 9, wherein, in the forming of the Co-based alloy layer by laser overlay welding, a subsequent overlay layer is formed so as to overlap a previously applied adjacent overlay layer.

11. The method of manufacturing the high-pressure fuel supply pump according to claim 9, wherein the Cr-enriched portion is formed circumferentially with respect to the first Co-based alloy layer.

12. The method of manufacturing a high-pressure fuel supply pump according to claim 9, wherein a plurality of circularly formed Cr-enriched portions are formed having different diameters with respect to the first Co-based alloy layer.

13. The method of manufacturing a high-pressure fuel supply pump according to claim 9, wherein the Cr enriched portion is formed linearly or spirally with respect to the first Co-based alloy layer.

* * * * *